(12) United States Patent
Nagao

(10) Patent No.: US 9,786,272 B2
(45) Date of Patent: Oct. 10, 2017

(54) DECODER FOR SEARCHING A DIGRAPH AND GENERATING A LATTICE, DECODING METHOD, AND COMPUTER PROGRAM PRODUCT

(71) Applicant: KABUSHIKI KAISHA TOSHIBA, Minato-ku, Tokyo (JP)

(72) Inventor: Manabu Nagao, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 174 days.

(21) Appl. No.: 14/574,892

(22) Filed: Dec. 18, 2014

(65) Prior Publication Data

US 2015/0179166 A1 Jun. 25, 2015

(30) Foreign Application Priority Data

Dec. 24, 2013 (JP) ................................. 2013-266007

(51) Int. Cl.
*G10L 15/08* (2006.01)
*G10L 19/00* (2013.01)
(Continued)

(52) U.S. Cl.
CPC ............ *G10L 15/08* (2013.01); *G06K 9/6297* (2013.01); *G10L 15/142* (2013.01); *G10L 2015/081* (2013.01); *G10L 2015/085* (2013.01)

(58) Field of Classification Search
CPC . G10L 15/08; G10L 15/142; G10L 2015/085; G10L 2015/081; G06K 9/6297
See application file for complete search history.

(56) References Cited

U.S. PATENT DOCUMENTS 4,849,905 A 7/1989 Loeb et al.
7,110,621 B1 * 9/2006 Greene .................... G06K 9/03
382/310

(Continued)

FOREIGN PATENT DOCUMENTS

JP 01-147725 6/1989
JP 4241771 3/2009
(Continued)

OTHER PUBLICATIONS

G. Saon, et al. "Anatomy of an extremely fast LVCSR decoder," in Proceedings of the INTERSPEECH, 2005, pp. 549-552, Sep. 4-8, 2005, Lisbon, Portugal.

(Continued)

*Primary Examiner* — Qian Yang
(74) *Attorney, Agent, or Firm* — Amin, Turocy & Watson LLP

(57) ABSTRACT

According to an embodiment, a decoder includes a token operating unit, a node adder, and a connection detector. The token operating unit is configured to, every time a signal or a feature is input, propagate each of a plurality of tokens, which is an object assigned with a state of the of a path being searched, according to a digraph until a state or a transition assigned with a non-empty input symbol is reached. The node adder is configured to, in each instance of token propagating, add, in a lattice, a node corresponding to a state assigned to each of the plurality of tokens. The connection detector is configured to refer to the digraph and detect a node that is connected to a node added in an i-th instance in the lattice and that is added in an i+1-th instance in the lattice.

18 Claims, 14 Drawing Sheets

(51) Int. Cl.
*G10L 15/14* (2006.01)
*G06K 9/62* (2006.01)

(56) References Cited

U.S. PATENT DOCUMENTS

| | | | |
|---|---|---|---|
| 7,711,561 | B2 | 5/2010 | Hogenhout et al. |
| 7,895,040 | B2 | 2/2011 | Sakai et al. |
| 8,275,730 | B2 | 9/2012 | Nagao |
| 8,311,825 | B2 | 11/2012 | Chen |
| 8,484,154 | B2 | 7/2013 | You et al. |
| 8,744,836 | B2 | 6/2014 | Nagao |
| 2010/0004920 | A1* | 1/2010 | Macherey ............ G06F 17/2818 704/4 |
| 2011/0270851 | A1 | 11/2011 | Mishina et al. |
| 2013/0073503 | A1 | 3/2013 | Nagao |
| 2013/0073564 | A1 | 3/2013 | Nagao |
| 2013/0179158 | A1 | 7/2013 | Nakamura et al. |
| 2014/0236591 | A1* | 8/2014 | Yue ....................... G10L 15/083 704/230 |
| 2015/0179166 | A1* | 6/2015 | Nagao .................... G10L 15/08 704/221 |

FOREIGN PATENT DOCUMENTS

| | | |
|---|---|---|
| JP | 4322815 | 9/2009 |
| JP | 2011-198126 | 10/2011 |
| JP | 2011-233023 | 11/2011 |
| JP | 4956334 | 6/2012 |
| JP | 4977163 | 7/2012 |
| JP | 5121650 | 1/2013 |
| JP | 2013-065188 | 4/2013 |
| JP | 2013-164572 | 8/2013 |

OTHER PUBLICATIONS

D. Povey, et al. "Generating exact lattices in the WFST framework," in Proceedings of the International Conference on Acoustics, Speech, and Signal Processing (ICASSP '12), pp. 4213-4216, 2012.

S. J. Young, et al. "Token passing: A simple conceptual model for connected speech recognition systems," Cambridge University Engineering Department, Jul. 31, 1989, 23 pages.

S. Phillips, et al. "Parallel speech recognition," International Journal of Parallel Programming, vol. 27, No. 4, 1999, Plenum Publishing Corporation, pp. 257-288.

Y. Guo, et al. "Lattice generation with accurate word boundary in WFST framework," 5th International Congress on Image and Signal Processing (CISP), 2012, pp. 1592-1595.

K. You, et al. "Parallel scalability in speech recognition," IEEE Signal Processing Magazine, Nov. 2009, pp. 124-135, vol. 26, Issue 6.

J. Chong, et al. "Scalable HMM based inference engine in large vocabulary continuous speech recognition," IEEE International Conference on Multimedia and Expo (ICME), 2009, pp. 1797-1800.

M. Novak. "Memory efficient approximative lattice generation for grammar based decoding," in Proceedings of the INTERSPEECH 2005, pp. 573-576, Sep. 4-8, 2005, Lisbon, Portugal.

A. Ljolje, et al. "Efficient general lattice generation and rescoring," in Proceedings of the EUROSPEECH 1999, pp. 1251-1254, vol. 3, 1999.

A. Lee, et al. "Large vocabulary continuous speech recognition based on muliti-pass search using word trellis index," The IEICE Transactions on Information and Systems (Japanese Edition), 1999, pp. 1-9, D-11, vol. 82-DII(1).

A. Lee, et al. "An efficient two-pass search algorithm using word trellis index," in Proceedings of the International Conference on Spoken Language Processing (ICSLP '98), 1998, pp. 1831-1834.

K. Hanazawa, et al. "An efficient search method for large-vocabulary continuous-speech recognition," in Proceedings of the International Conference on Acoustics, Speech, and Signal Processing (ICASSP '97), 1997, pp. 1787-1790, vol. 3.

F. K. Soong, et al. "A tree-trellis based fast search for finding the N best sentence hypotheses in continuous speech recognition," in Proceedings of the International Conference on Acoustics, Speech, and Signal Processing (ICASSP '91), 1991, pp. 705-708, vol. 1.

* cited by examiner

FIG.4

1.   $L[0] \leftarrow \{(q,0,0) | q \in I\}, f \leftarrow 0$
2.   while there is a next feature vector
3.       $v \leftarrow$ get feature vector
4.       $T \leftarrow \emptyset$
5.       foreach $t \in L[f]$
6.           foreach $e \in \text{outgoing}(\text{state}(t))$
7.               $t_{\text{new}} \leftarrow (n(e), \text{tacc\_score}(t) + w(e), 0)$
8.               $T \leftarrow T \cup \{t_{\text{new}}\}$
9.       $T \leftarrow \bigcup\limits_{(q,\cdot,\cdot) \in T} \left\{ \arg\max\limits_{(q,w,\cdot) \in T} w \right\}$
10.     foreach $t \in T$
11.         $\text{tam\_score}(t) \leftarrow \text{am\_score}(v, \text{input}(\text{incoming}(\text{state}(t))))$
12.         $\text{tacc\_score}(t) \leftarrow \text{tacc\_score}(t) + \text{tam\_score}(t)$
13.       $w_{\max} \leftarrow \max\limits_{(\cdot,w,\cdot) \in T} w$
14.       $f \leftarrow f + 1$
15.       $L[f] \leftarrow \{t \in T \mid \text{tacc\_score}(t) > w_{\max} - w_{\text{beam}}\}$
16.   $x_q \leftarrow \varepsilon$
17.   $\Theta \leftarrow \bigcup\limits_{t \in L[f]} \{(t, w + \rho(q), o) \mid (q, w, o) \in \text{eps}(\text{state}(t))), q \in F\}$
18.   if $\Theta = \emptyset$
19.       return $(\varepsilon, \varepsilon)$
20.   $(t_{\text{best}}, \cdot, x_w) \leftarrow \arg\max\limits_{(t,w,o) \in \Theta} \text{tacc\_score}(t) + w$
21.   while $f > 0$
22.       $f \leftarrow f - 1$
23.       $(t_{\text{best}}, e_{\text{best}}) \leftarrow$ select $(t, e)$ such that $t \in L[f], e \in \text{outgoing}(\text{state}(t))$,
                $n(e) = \text{state}(t_{\text{best}}), \text{tacc\_score}(t) + w(e) + \text{tam\_score}(t_{\text{best}}) = \text{tacc\_score}(t_{\text{best}})$
24.       $x_q \leftarrow \text{input}(e_{\text{best}}) \cdot x_q, \; x_w \leftarrow \text{output}(e_{\text{best}}) \cdot x_w$
25. return $(x_w, x_q)$

FIG.8 prune($f_{begin}, f_{end}$)
1  for $i$ from $f_{end} - 1$ to $f_{begin}$
2    $L[i] \leftarrow \{t \in L[i] \mid e \in \text{outgoing}(\text{state}(t)), t_n \in L[i+1], n(e) = \text{state}(t_n),$
          $\text{tacc\_score}(t) + w(e) + \text{tam\_score}(t_n) = \text{tacc\_score}(t_n)\}$

FIG.9

2    $L[i] \leftarrow \{t \in L[i] \mid e \in \text{outgoing}(\text{state}(t)), t_n \in L[i+1], n(e) = \text{state}(t_n)$

FIG.11

1   $f \leftarrow$ last frame number, $t_f \leftarrow$ make new node
2   $D \leftarrow \emptyset, R \leftarrow \emptyset$
3   $\Theta \leftarrow \bigcup_{t \in L[f]} \{(t, w + \rho(q), o) \mid (q, w, o) \in \text{eps}(\text{state}(t))), q \in F\}$
4   if $\Theta = \emptyset$
5     return $(D, R)$
6   $\text{tacc\_score}(t_f) \leftarrow \max_{(t,w,\cdot) \in \Theta}(\text{tacc\_score}(t) + w)$
7   $D \leftarrow D \cup \{t_f\}$
8   foreach $(t, w, o) \in \Theta$
9     $R \leftarrow R \cup \{(t, t_f, \varepsilon, o, w)\}, D \leftarrow D \cup \{t\}$
10  $T \leftarrow \{t \mid (t, \cdot, \cdot) \in \Theta\}$
11  while $f > 0$
12     $f \leftarrow f - 1$
13     $T_p \leftarrow \{t \in L[f] \mid e \in \text{outgoing}(\text{state}(t)), \text{n}(e) \in \text{state}(T)\}$
14     $D \leftarrow D \cup T_p$
15     foreach $t \in T_p$
16         foreach $e \in \text{outgoing}(\text{state}(t))$
17            if $\text{n}(e) \in \text{state}(T)$
18                 $t_n \leftarrow$ select $t' \in T$ such that $\text{n}(e) = \text{state}(t')$
19                 $R \leftarrow R \cup \{(t, t_n, \text{input}(e), \text{output}(e), w(e) + \text{tam\_score}(t_n))\}$
20     $T \leftarrow T_p$
21  return $(D, R)$

FIG.14

```
1  L[0] ← {(q,0,0)|q ∈ I}, f ← 0, n ← 0
2  while there is a next feature vector
3      v ← get feature vector
4      foreach T_sub ∈ split(L[f])
5          push(Q_task, (phase1, (T_sub))), n ← n + 1
6      T ← ∅
7      while n > 0
8          T ← T ∪ pop(Q_result), n ← n - 1
9      foreach T_sub ∈ split(T) such that state(T_1) ∩ state(T_2) = ∅ for any T_1, T_2 ∈ split(T)
10         push(Q_task, (phase2, (T_sub))), n ← n + 1
11     T ← ∅
12     while n > 0
13         T ← T ∪ pop(Q_result), n ← n - 1
14     foreach T_sub ∈ split(T)
15         push(Q_task, (phase3, (T_sub, v))), n ← n + 1
16     T ← ∅, w_max ← -∞
17     while n > 0
18         (T_r, w_r) ← pop(Q_result), n ← n - 1
19         T ← T ∪ T_r, w_max ← max(w_max, w_r)
20     f ← f + 1
21     foreach T_sub ∈ split(T)
22         push(Q_task, (phase4, (T_sub, w_max))), n ← n + 1
23     L[f] ← ∅
24     while n > 0
25         L[f] ← L[f] ∪ pop(Q_result), n ← n - 1
26 x_q ← ε
27 Θ ← ⋃_{t∈L[f]} {(t, w + ρ(q), o) | (q, w, o) ∈ eps(state(t))), q ∈ F}
28 if Θ = ∅
29     return (ε, ε)
30 (t_best, ·, x_w) ← arg max_{(t,w,o)∈Θ} tacc_score(t) + w
31 while f > 0
32     f ← f - 1
33     (t_best, e_best) ← select (t, e) such that t ∈ L[f], e ∈ outgoing(state(t)),
                n(e) = state(t_best), tacc_score(t) + w(e) + tam_score(t_best) = tacc_score(t_best)
34     x_q ← input(e_best) · x_q, x_w ← output(e_best) · x_w
35 return (x_w, x_q)
```

FIG.15

```
101  while decoder is running
102      (u_name, u_data) ← pop(Q_task)
103      if u_name = phase1
104          (T_t) ← u_data, T_new ← ∅
105          foreach t ∈ T_t
106              foreach e ∈ outgoing(state(t))
107                  t_new ← (n(e), tacc_score(t) + w(e), 0)
108                  T_new ← T_new ∪ {t_new}
109          push(Q_result, T_new)
110      if u_name = phase2
111          (T_t) ← u_data
```

$$112 \quad \text{push}\left(Q_{result}, \bigcup_{(q,\cdot,\cdot) \in T_t} \left\{\underset{(q,w,\cdot) \in T_t}{\arg\max} \, w\right\}\right)$$

```
113      if u_name = phase3
114          (T_t, v) ← u_data
115          foreach t ∈ T_t
116              tam_score(t) ← am_score(v, input(incoming(state(t))))
117              tacc_score(t) ← tacc_score(t) + tam_score(t)
```

$$118 \quad w_{max} \leftarrow \max_{(\cdot, w, \cdot) \in T_t} w$$

```
119          push(Q_result, (T_t, w_max))
120      if u_name = phase4
121          (T_t, w_max) ← u_data
122          push(Q_result, {t ∈ T_t | tacc_score(t) > w_max − w_beam})
```

DECODER FOR SEARCHING A DIGRAPH AND GENERATING A LATTICE, DECODING METHOD, AND COMPUTER PROGRAM PRODUCT

CROSS-REFERENCE TO RELATED APPLICATION

This application is based upon and claims the benefit of priority from Japanese Patent Application No. 2013-266007, filed on Dec. 24, 2013; the entire contents of which are incorporated herein by reference.

FIELD

Embodiments described herein relate generally to a decoder, a decoding method, and a computer program product.

BACKGROUND

It is a known technology in which the pattern of input signals is recognized and the signal sequence that has been input is converted into a corresponding symbol string. For example, there are known technologies such as the technology for recognizing speech signals; the optical character recognition (OCR) technology in which characters are recognized from an image in which the characters are written; the technology for recognizing handwritten characters; and the technology for recognizing a gesture or sign language from an image. As a device for implementing such technologies, a decoder is known that searches a digraph which is formed by adding output symbols to a weighted finite state automaton (for example, searches a weighted finite state transducer).

A decoder for searching a digraph, such as a weighted finite state transducer, can also generate a lattice during the search. However, in such a decoder, as the search is carried on, a large number of nodes and arcs need to be added in a lattice. Moreover, in such a decoder, as the search is carried on, there is an increase in the pointers or arcs which represent the inter-node connections and which need to be appropriately destroyed. For that reason, in a decoder capable of generating a lattice during the search, the amount of processing during the search becomes enormous.

BRIEF DESCRIPTION OF THE DRAWINGS

FIG. 4 is a diagram illustrating a pseudo code for the processes performed in the decoder according to the first embodiment;

FIG. 8 is a diagram illustrating a pseudo code for the processes performed in the decoder according to the second embodiment;

FIG. 9 is a diagram illustrating a modification example of the pseudo code for the processes performed in the decoder according to the second embodiment;

FIG. 11 is a diagram illustrating a pseudo code for the processes performed in the decoder according to the third embodiment;

FIG. 14 is a diagram illustrating a pseudo code for the processes performed in a main thread; and FIG. 15 is a diagram illustrating a pseudo code for the processes performed in a worker thread.

DETAILED DESCRIPTION

Figure 1:
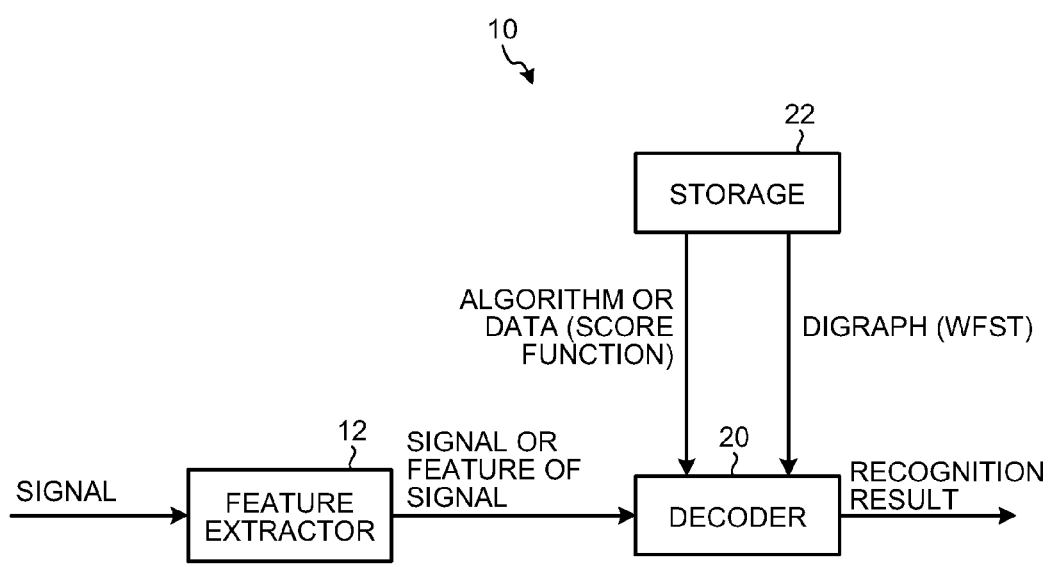
FIG. 1 is a block diagram of a pattern recognition device according to a first embodiment.

According to an embodiment, a decoder searches a digraph and generating a lattice, partially or entirely, corresponding to a signal that is input or corresponding to a feature of the signal. The digraph has an input symbol and an output symbol assigned to a state or a transition. The input symbol is a score identifier that represents at least either an algorithm or data for calculating a signal score from the signal or the feature. The decoder includes a token operating unit, a node adder, and a connection detector. The token operating unit is configured to, every time the signal or the feature is input, propagate each of a plurality of tokens, which is an object assigned with a state of the head of a path being searched, according to the digraph until a state or a transition assigned with a non-empty input symbol is reached. The node adder is configured to, in each instance of token propagating, add, in the lattice, a node corresponding to a state assigned to each of the plurality of tokens. The connection detector is configured to refer to the digraph and detect a node that is connected to a node added in an i-th instance (where i is an integer equal to or greater than one) in the lattice and that is added in an i+1-th instance in the lattice.

Premise

Firstly, the explanation is given about the technology and the definitions serving as the premise of embodiments.

WFST

In the embodiments, a search is performed in a weighted finite state transducer (WFST). Meanwhile, in the embodiments, the explanation is given for an example in which a WFST is used as a digraph. However, as long as input symbols, output symbols, and weights are assigned to either states or transitions; it is also possible to search another digraph having a different assignment pattern. Alternatively, it is also possible to search a non-weighted digraph (same as a digraph having the weights equal to zero).

In a WFST, a transition has an input symbol, an output symbol, and a weight assigned thereto. A WFST is configured as a 9-tuple (Q, E, Σ, Γ, K, I, F, λ, ρ) including a set Q of states, a set E of transitions, a set Σ of input symbols, a set Γ of output symbols, a set K of weights, a set I of initial states, a set F of final states, an initial weight function λ, and a final weight function ρ. Moreover, a transition is configured as a 5-tuple (previous state, next state, input symbol, output symbol, weight).

Examples of the set K of weights include a set of all integers, a set of all real numbers, a set of all complex numbers, a matrix, and a set of Booleans (0 and 1). Besides, the set K of weights can be a set of non-positive real numbers or a set of non-negative real numbers. Meanwhile, corresponding to an initial state $q_i \in I$, the initial weight is expressed as $\lambda(q_i)$. Similarly, corresponding to a final state $q_f \in F$, the final weight is expressed as $\rho(q_f)$. The set $\Sigma$ of input symbols and the set $\Gamma$ of output symbols may include an empty symbol $\epsilon$ too.

Acoustic Model and Signal Score

For example, consider a case in which speech recognition is performed in a continuous manner using a WFST. In this case, prior to performing a recognition operation, firstly, the following is prepared: an acoustic model for the purpose of converting the feature of an input speech signal into small units (such as phonemes) representing speech; a lexicon for the purpose of converting small units (such as phonemes) representing speech into words; and a language model for the purpose of constraining the arrangement of words. Then, each of those models is converted into a WFST; and the models represented as WFSTs are combined. Herein, the models can be combined into a single model. Alternatively, some portion of the models may not be combined, and the noncombined portion may be combined in a dynamic manner during speech recognition.

Herein, the acoustic model is a model for the purpose of calculating a score (an acoustic score or an output probability) that indicates the degree of similarity between an input speech signal and a particular phoneme or a part of a particular phoneme. In the case of performing character recognition or gesture recognition too, such a model is used in an identical manner so as to calculate a score representing the degree of similarity; and then pattern recognition is performed. In the embodiments, including the case of performing speech recognition, the value calculated using such a model, that is, the value indicating the degree of similarity between an input signal and an output symbol is called a signal score.

HMM, feature, score function

While performing speech recognition, it is often the case that a hidden Markov model (HMM) is used as an acoustic model. Broadly, there are two methods for converting an HMM into a WFST. In the first method, it is assumed that the HMM is included in the transitions of the WFST. In the second method, the input symbols of the transitions are assigned with score identifiers that are used in identifying an algorithm (including a function, a computer program, a table, or an array) for calculating the signal scores, or in identifying data (including parameters), or in identifying an algorithm as well as data.

In the embodiments, the explanation is given for a case in which the search is performed using a WFST converted according to the second method. However, it is also possible to use a WFST converted according to the first method.

In order to calculate the signal scores from the acoustic model, not only the score identifiers are required, but also the input signal sequence or the feature of the input signals is required. There are times when the feature is made of a plurality of values. In such a case, the group of a plurality of features is called a feature vector. In the embodiments, including the case in which the feature is made of a plurality of values, the term feature is used.

In the embodiments, as the algorithm or the data for calculating the signal scores, a score function is used. The score function takes a signal or the feature of a signal and a score identifier as arguments, and outputs a signal score. In the case of performing speech recognition, the score function is called, for example, an acoustic score function. Moreover, the score identifier used in identifying an acoustic score function is called an acoustic score function identifier. Also, there are times when the acoustic score function identifier is called a probability distribution function identifier.

Regarding the method by which the score function calculates the signal scores, it is possible to implement any arbitrary method. For example, in the case of performing speech recognition, the method of calculating the signal scores varies depending on the type of the applied HMM. For a discrete HMM, based on a code vector corresponding to the feature and the score identifiers, the score function obtains the signal scores recorded in the form of a table or an array. For a continuous HMM, based on a plurality of parameters used in expressing the Gaussian distribution obtained from the score identifiers and based on the feature, the score function calculates the signal scores. Alternatively, the score function can calculate the signal scores using other methods such as using a neural network.

Meanwhile, herein, the explanation of the model for calculating the signal scores is given with reference to an HMM as the example. However, as long as a digraph has the score identifiers assigned to the states or the transitions, a model other than an HMM can also be used. For example, it is possible to use template matching in place of an HMM. Then, a template can be expressed in the form of a digraph, and a function for calculating the distance between an input feature and the template can be treated as the score function.

Search

The process of searching a WFST implies calculating such a series (a path) consisting of states and transitions for which the value obtained by accumulating the signal scores and the weights according to the input signal sequence or the feature sequence of signals is the best value. This accumulated value is called an accumulation score. In the case in which the WFST has a language model combined therewith, the score obtained from the language model is also included in the accumulation score.

The path having the best accumulation score is generally found using the Viterbi algorithm. Moreover, instead of finding only the best path, there are times when the paths from the best path to the N-th best path are found.

Consider a case in which the accumulation score is in the form of the distance, and assume that it is better to have a smaller distance. In that case, the process of finding out the path having the best accumulation score is identical to the process of searching for the shortest path of a directed acyclic graph in which, every time a speech signal is input, one or more state and one or more transition are added.

Token Passing

In the process of searching for a path in a WFST that is converted from an HMM, a technology called token passing is often used. In this technology, an object called a token is used. To the token is assigned the state of the head of the path being searched. In the process of searching a WFST, since a plurality of paths is searched in parallel, a plurality of tokens is managed at the same time. Moreover, a token holds the accumulation score of the path.

Every time a signal or a feature is input, the token is propagated. That is, every time a signal or a feature is input, the state assigned to the token is changed according to the transitions of the WFST. In the case in which a single state has a plurality of outgoing transitions, the token assigned with that single state is duplicated for a number equal to the number of outgoing transitions. Moreover, in the case in which a plurality of tokens reach a single state; only one token having the best accumulation score is held in principle and the remaining tokens are destroyed.

Lattice

In the embodiments, during the search of a WFST, a lattice is generated. In the embodiments, a lattice is a graph including nodes, or is a directed acyclic graph including nodes and arcs. Herein, the terms nodes and arcs are used in order to distinguish between states and transitions of a directed graph (for example, a WFST) to be searched.

The nodes and the arcs of a lattice can have labels assigned thereto. Moreover, the nodes and the arcs of a lattice can have scores assigned thereto.

First Embodiment

Overall Configuration

FIG. 1 is a diagram illustrating a configuration of a pattern recognition device 10 according to a first embodiment. The following explanation is given about the pattern recognition device 10 according to the first embodiment.

The pattern recognition device 10 recognizes the pattern of input signals and outputs a recognition result. The signals input to the pattern recognition device 10 can be of any type as long as they represent patterns. Examples of the input signals include speech signals, signals representing handwriting, image signals representing characters, or moving-image signals representing gestures such as the sign language.

The pattern recognition device 10 includes a feature extractor 12, a decoder 20, and a storage 22.

The feature extractor 12 receives input of signals representing a pattern, and obtains the feature of the signals at regular time intervals. Then, the feature extractor 12 sends the obtained feature of the signals to the decoder 20.

The feature represents information indicating the section-by-section features of a signal, and is used by the decoder 20 in calculating the signal scores. When a speech signal is received as input, the feature extractor 12 obtains the feature in, for example, the units of 10 milliseconds (on a frame-by-frame basis).

Meanwhile, the duration of signals that is used in calculating the feature need not match with the period of time of outputting the feature. Moreover, in the case in which the decoder 20 calculates the signal scores using the actual signals, the feature extractor 12 can send segmented signals, which are segmented at regular intervals, to the decoder 20.

Every time the feature extractor 12 receives input of signals or the feature of signals, the decoder 20 searches a WFST that has been created in advance. During the search, the decoder 20 generates a lattice according to the input signal sequence or according to the feature sequence of the signals. When the input of the signals is completed; from the lattice generated during the search and from the WFST, the decoder 20 detects the path having the best accumulation score and outputs, as the recognition result, an output symbol string in which the output symbols present in the detected path are connected.

Herein, as the output symbol string, the decoder 20 can output, for example, a string of words, or a string of phonemes, or a symbol string of smaller units than phonemes. Alternatively, the decoder 20 can output a symbol string having a combination of the strings mentioned above.

Moreover, in the first embodiment, during the search of a digraph, the decoder 20 generates a lattice not including arcs.

The storage 22 is used to store a WFST that has been created in advance. The decoder 20 can constantly refer to the WFST stored in advance in the storage 22 and perform the search.

The storage 22 is used to store either the algorithm, or the data, or the algorithm and the data referred to for the purpose of calculating the signal scores. In the first embodiment, the storage 22 is used to store a score function that takes a score identifier and a signal or the feature of a signal as arguments, and calculates a signal score. Moreover, in the first embodiment, the state transition scores of the HMM that were not assigned to the transitions of the WFST as weights can also be stored in the storage 22 along with the score function. Furthermore, the storage 22 can also be used to store, as data, other information that is not stored in the WFST.

Herein, the decoder 20 searches a WFST according to the token passing method. While searching the WFST, the decoder 20 can call the score function with arguments in the form of a score identifier obtained from the WFST and a signal or the feature of a signal; and calculate a signal score. Moreover, the decoder 20 can obtain the weights of the WFST from the storage 22. If the storage 22 is storing the score function as well as the state transition scores of the HMM, then the decoder 20 can obtain the state transition scores too. With that, the decoder 20 can calculate the accumulation score by accumulating the weights of the transitions in the path being searched and the signal scores. When the state transition scores of the HMM are available, they can also be accumulated in the accumulation score.

Meanwhile, the input symbols in the WFST, which is stored in the storage 22, are assigned with the score identifiers that are used in calculating the signal scores. Moreover, the WFST is converted in advance in such a way that the incoming transitions to a single state are assigned with only one type of input symbols.

Configuration

Figure 2:
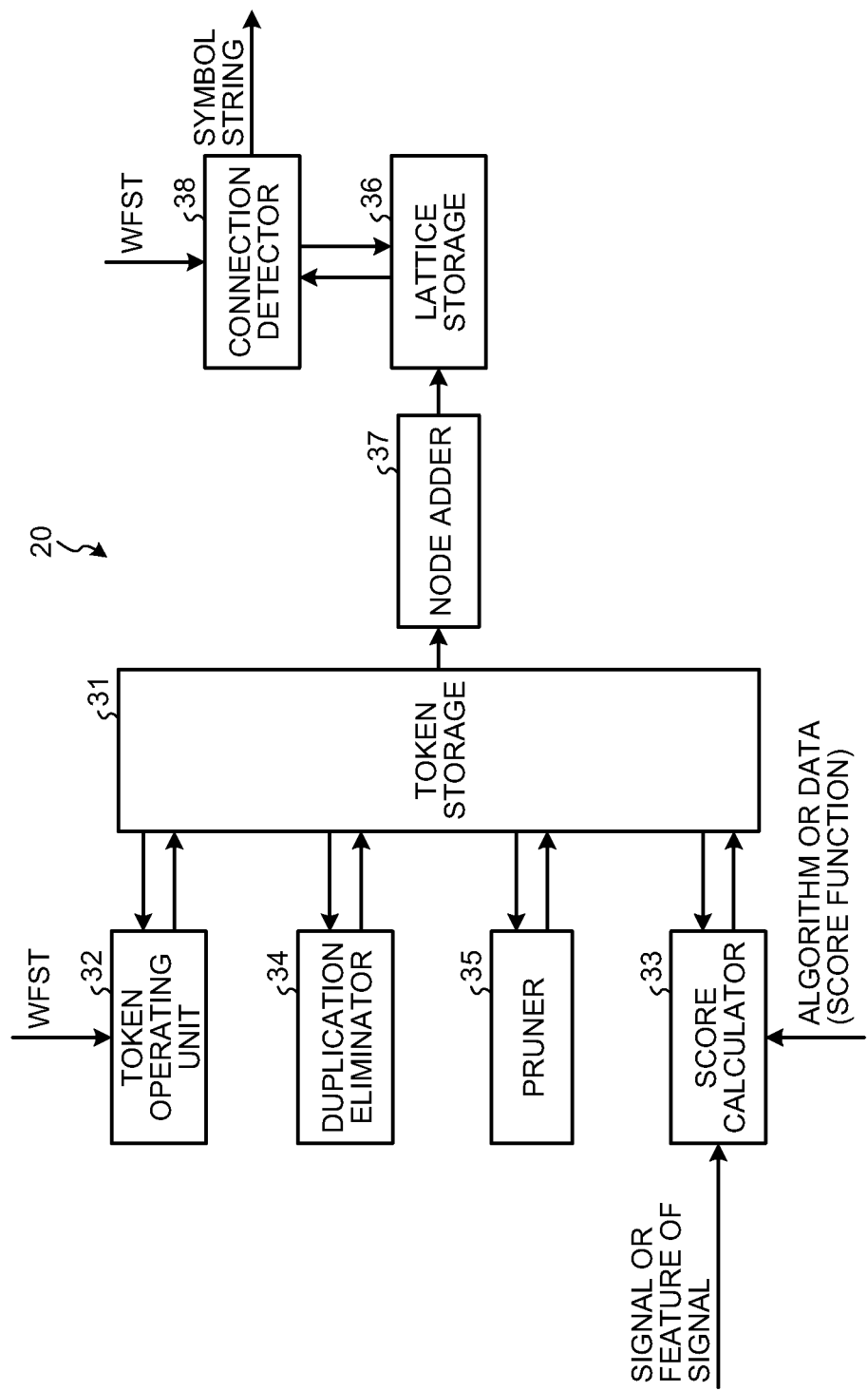
FIG. 2 is a block diagram of a decoder according to the first embodiment.

FIG. 2 is a block diagram of the decoder 20 according to the first embodiment. The decoder 20 includes a token storage 31, a token operating unit 32, a score calculator 33, a duplication eliminator 34, a pruner 35, a lattice storage 36, a node adder 37, and a connection detector 38.

The token storage 31 is used to store one or more tokens. Prior to the input of a signal or the feature of a signal, the token storage 31 is used to store the tokens assigned with the initial states.

Each of a plurality of tokens holds information indicating the state assigned thereto. As long as each of a plurality of tokens and the state assigned thereto are stored in a corresponding manner in the token storage 31, the association between the tokens and the assigned states can be of any arbitrary type.

Moreover, each of a plurality of tokens holds an accumulation score obtained by accumulating the signal scores, which are calculated from the input symbols (the score identifiers) present in the path represented by the token, and the weights (for example, the state transition scores) assigned to the transitions in the path. Meanwhile, in the first embodiment, the tokens do not hold the input symbols. That is because, as described later, the tokens can obtain the input symbols by referring to the incoming transitions with respect to the respective assigned states.

Furthermore, each of a plurality of tokens can also hold context information. As an example, in the case in which the search is performed while combining two WFSTs in a dynamic manner, the context information contains the state of the head of the paths of the second WFST. Moreover, as an example, in the case in which an output symbol string assigned to the already-passed transitions is used as a part of the feature; the context information can include that output symbol string.

Each state of the WFST is assigned to a single token in principle. In the case in which the context information is also included, a 2-tuple of the assigned state and the context information is assigned to a single token. In that case, consequently, each state of the WFST may get assigned to a plurality of tokens.

Every time a signal or the feature is input, the token operating unit 32 propagates each of a plurality of tokens, which is stored in the token storage 31, according to the WFST and until a transition assigned with a non-empty input symbol is passed. Herein, propagating a token implies changing the state assigned to the token to the next state. In the case of searching a digraph in which the states have input symbols assigned thereto, the token operating unit 32 propagates a token until a state assigned with a non-empty input symbol is reached.

In this case, if a state assigned with a token has a plurality of outgoing transitions, then the token operating unit 32 creates a token corresponding to each of a plurality of transitions and propagates each created token according to the corresponding transition to the next state.

Every time the token operating unit 32 propagates the tokens until a transition assigned with a non-empty input symbol is passed, the score calculator 33 calculates the signal score and the accumulation score with respect to each of a plurality of tokens. More specifically, with respect to each of a plurality of tokens, the score calculator 33 calls the score function that corresponds to the input symbol (the score identifier) assigned to the transition which was passed as a result of the previous propagation, and calculates the signal score based on the input symbol. Moreover, with respect to each of a plurality of tokens, the score calculator 33 calculates the accumulation score by accumulating the weights and the signal scores in the path represented by the concerned token. Then, the score calculator 33 instructs the tokens, which are stored in the token storage 31, to hold the respective signal scores and the respective accumulation scores. Meanwhile, in the case of searching a digraph not having the weights attached thereto, the score calculator 33 does not perform processes related to the weights, and calculates the accumulation scores with the weights set to zero.

Every time the token operating unit 32 propagates the tokens until a transition assigned with a non-empty input symbol is passed, the duplication eliminator 34 eliminates the duplication of tokens. More specifically, the duplication eliminator 34 eliminates the duplication of such two or more tokens which have the same state assigned thereto. As an example, the duplication eliminator 34 keeps only one token having a suitable accumulation score and destroys the remaining tokens out of the two or more tokens which have the same state assigned thereto.

In the case in which a token holds the context information too, the duplication eliminator 34 eliminates the duplication of such two or more tokens which have the same state assigned thereto and which hold the same context information. With that, for example, in the case in which the search is performed while combining two WFSTs in a dynamic manner, the duplication eliminator 34 becomes able to keep such tokens which have the same state assigned thereto in one WFST but have different states assigned thereto in the other WFST.

Every time the token operating unit 32 propagates the tokens until a transition assigned with a non-empty input symbol is passed; the pruner 35 eliminates the tokens, from among a plurality of tokens stored in the token storage 31, which have the accumulation score worse than a certain score. As an example, the pruner 35 eliminates the tokens having the accumulation score worse by a certain score than the best of the accumulation scores of a plurality of tokens.

The lattice storage 36 is used to store a lattice. Prior to the input of a signal or the input of the feature of a signal, the lattice storage 36 is used to store an empty lattice. Then, during the period in which the input of the feature is ongoing, the lattice storage 36 is used to store under-generation lattices.

Every time the token operating unit 32 propagates the tokens until a transition assigned with a non-empty input symbol is passed; the node adder 37 adds, in the lattice stored in the lattice storage 36, a node corresponding to the state assigned to each of a plurality of tokens stored in the token storage 31. In this case, the node adder 37 adds the nodes in a corresponding manner to the number of times for which a token is added in the lattice (that is, the number of times for which a signal or the feature of a signal is input).

Moreover, to each node to be added, the node adder 37 associates the following: (1) the accumulation score of the source token; (2) the signal score of the source token; and (3) the state of the head of the path represented by the source token. Herein, the node adder 37 can associate each node and the abovementioned information in any arbitrary manner. For example, the node adder 37 can instruct the nodes to hold the respective sets of information, or can store the information in a separate table in a corresponding manner to the nodes.

Upon completion of node addition (for example, upon completion of the input of a signal or the feature of a signal or upon completion of the input of a certain number of signals or the feature of a certain number of signals), the connection detector 38 refers to the lattice, which is stored in the lattice storage 36, and to the WFST; and detects the path having the best accumulation score from among the paths established from the initial states to the final states. Then, the connection detector 38 outputs a symbol string in which the output symbols present in the best path are joined.

More specifically, the connection detector 38 refers to the WFST and detects nodes that are connected to the node added in the i-th instance (where i is an integer equal to or greater than one) in the lattice and that are added in the i+1-th instance in the lattice. That is, the connection detector 38 refers to the WFST and determines whether or not a transition exists from the state of the WFST corresponding to the node added in the i-th instance in the lattice to the state of the WFST corresponding to any one of the nodes added in the i+1-th instance. If such a transition exists in the WFST, then the connection detector 38 detects that there exists a node which is connected to the node added in the i-th instance in the lattice and which is added in the i+1-th instance in the lattice.

Herein, the node added in the i-th instance is treated as a first node, and a node connected to the first node and added in the i+1-th instance is treated as a second node. Then, the connection detector 38 detects a path in which the value obtained by adding the accumulation score associated to the first node, the signal score associated to the second node, and the weights in the path connecting the first node and the second node is identical to the accumulation score associated to the second node. In the case of searching a digraph not having the weights attached thereto, the connection detector 38 calculates the path with the weights set to zero.

Furthermore, the connection detector 38 detects the nodes having the best accumulation score from among the nodes added in the last instance. The detected node corresponds to the end node of the best path. Then, by treating the detected node as the second node, the connection detector 38 performs the process of detecting the connection relationship and detects the first node in the best path. Then, by treating the detected first node as the second node, the connection detector 38 performs the same operation. Thus, in a reverse sequential manner, the connection detector 38 repeatedly performs the same process up to the node added in the first instance in the lattice. Then, the connection detector 38 detects the best path from the node corresponding to the initial state to the node corresponding to a final state, and joins and outputs the output symbols present in the detected best path. Alternatively, the connection detector 38 can be configured to join and output the input symbols present in the detected best path. Still alternatively, the connection detector 38 can be configured to join and output the input symbols as well as the output symbols present in the detected best path.

Process Flow

Figure 3:
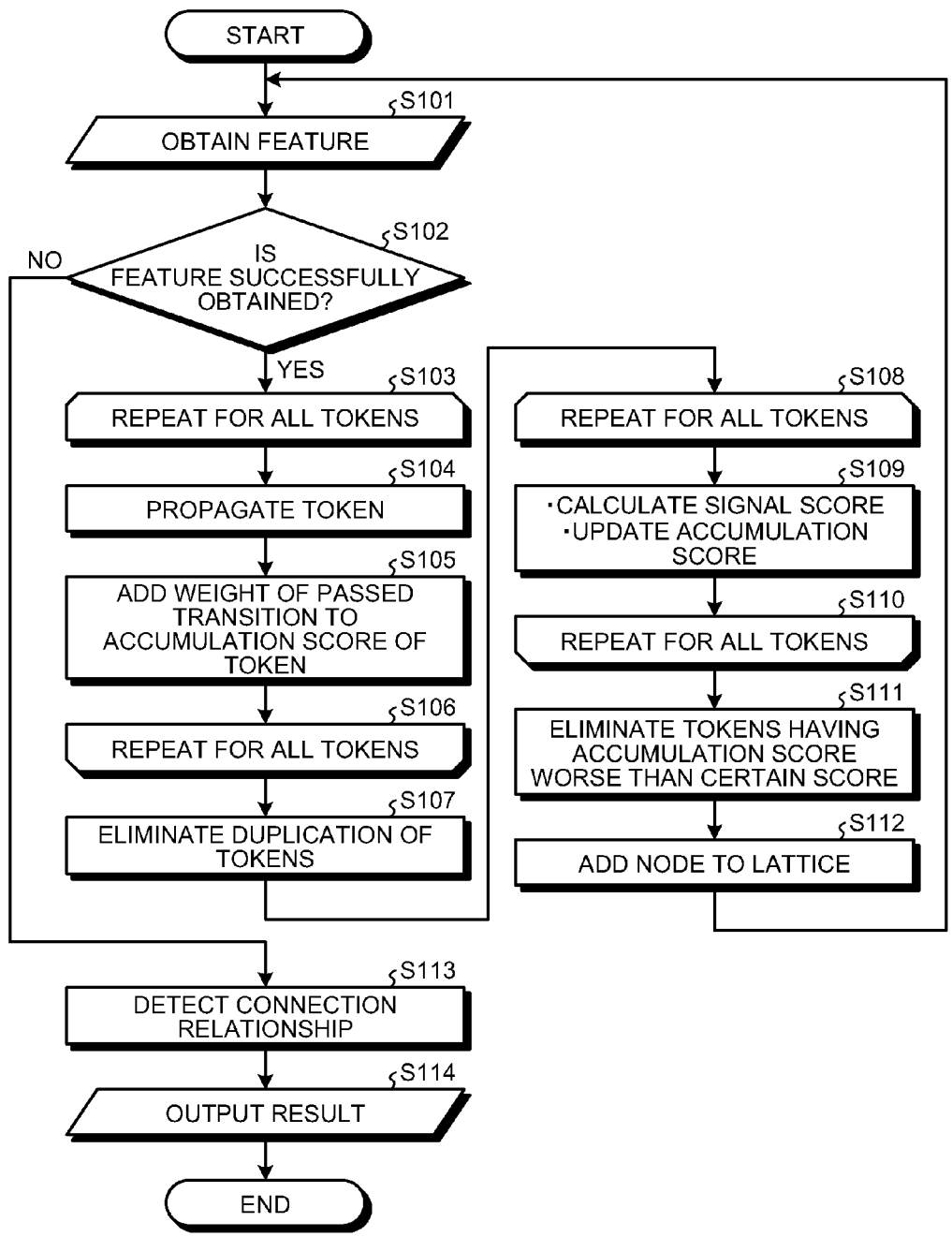
FIG. 3 is a flowchart for explaining a sequence of processes performed in the pattern recognition device according to the first embodiment.

FIG. 3 is a flowchart for explaining a sequence of processes performed by the decoder 20 according to the first embodiment. Once the input of a signal starts, the feature extractor 12 extracts the feature from the signal and sends it to the decoder 20. Then, the processes from Step S101 are performed in the decoder 20.

Firstly, the decoder 20 obtains the feature from the feature extractor 12 (Step S101). Then, the decoder 20 determines whether or not the feature is successfully obtained (Step S102). If the feature is successfully obtained (Yes at Step S102), the system control proceeds to a loop process from Step S103 to Step S106. Meanwhile, the decoder 20 can perform the process at Step S102 before performing the process at Step S101. In that case, at Step S102, the decoder 20 determines whether or not the next feature can be obtained.

During the loop process from Step S103 to Step S106, the decoder 20 performs the processes at Step S104 and Step S105 with respect to each token. That is, the decoder 20 propagates the concerned token from the state assigned thereto to the next state according to the transitions illustrated in the WFST (Step S104). In this case, the decoder 20 propagates the concerned token until a transition assigned with a non-empty input symbol is passed. Then, the decoder 20 obtains the weights that are assigned to the transitions passed by the concerned token, and adds the weights to the accumulation score of the token (Step S105).

Once the loop process from Step S103 to Step S106 is completed, the system control proceeds to Step S107. Then, the decoder 20 detects whether there exist two or more tokens which have the same state assigned thereto (Step S107). If there exist such two or more tokens, then the decoder 20 keeps only one token having the best accumulation score and destroys the remaining tokens.

Then, a loop process from Step S108 to Step S110 is performed in the decoder 20. During the loop process from Step S108 to Step S110, the decoder 20 performs the process at Step S109 with respect to each token. That is, the decoder 20 calculates the signal score of the concerned token. Then, the decoder 20 adds the signal score to the accumulation score held by the concerned token, and thus updates the accumulation score (Step S109).

Once the loop process from Step S108 to Step S110 is completed, the system control proceeds to Step S111. Then, the decoder 20 eliminates the tokens having the accumulation score worse than a certain score (Step S111).

Upon the completion of the process at Step S111, the system control proceeds to Step S112. Then, the decoder 20 adds, in a lattice, a node corresponding to the state that is assigned to each of a plurality of tokens (Step S112). In this case, the decoder 20 associates each added node with the signal score and the accumulation score of the corresponding token and with the state of the head of the path represented by the corresponding token.

Upon the completion of the process at Step S112, the system control returns to Step S101. Herein, every time a feature is input, the decoder 20 repeats the processes from Step S103 to Step S112.

Meanwhile, if the feature is not successfully obtained, that is, if the input of signal ends (No at Step S102); then the system control proceeds to Step S113.

Then, the decoder 20 refers to the lattice, which is stored in the lattice storage 36, and to the WFST and detects the path having the best accumulation score from among the paths established from the initial states to the final states (Step S113). Upon the completion of the process at Step S113, the decoder 20 outputs, as the recognition result, a symbol string in which the output symbols present in the best path are joined (Step S114). The completion of the process at Step S114 marks the end of the flow of processes.

Pseudo Code

FIG. 4 is a diagram illustrating a pseudo code for the processes performed in the decoder 20 according to the first embodiment. Thus, with reference to the pseudo code that is illustrated in FIG. 4 and that is executed by the decoder 20, the explanation is given about the detailed processes performed in the decoder 20.

Herein, t represents a token, and T represents a set of tokens. Moreover, L represents a lattice. Furthermore, f represents a frame number. Thus, L[f] represents a set of nodes added in the frame having the frame number f.

Moreover, state(t) represents the state assigned to the token t. Furthermore, tacc_score(t) represents the accumulation score held by the token t. Moreover, tam_score(t) represents the signal score held by the token t. The three elements, namely, the state, the accumulation score, and the signal score that are assigned to the token t are expressed as (state, accumulation score, signal score).

In this pseudo code, the processes are performed on the premise that a greater score is more suitable. Alternatively, if the function "max" in the pseudo code is changed to the function "min", and if the magnitude relationship during the comparison of scores is reversed; then the processes can be performed on the premise that a smaller score is more suitable.

Meanwhile, $w_{beam}$ represents a score difference that serves as the reference for pruning.

Moreover, ϵ represents that a symbol string is empty. When ϵ represents an input symbol, it implies that no score identifier is assigned to the input symbol. In an identical manner, when ϵ represents an output symbol; it implies that the information output as the recognition result, such as words, is not assigned to the output symbol.

In the first embodiment, a transition having ϵ as the input symbol is called an ϵ transition or an empty transition. Meanwhile, regarding a transition e, the next state is expressed as n(e). Moreover, input(e) represents the input symbol of the transition e, and output(e) represents the output symbol of the transition e. Furthermore, w(e) represents the weight of the transition e.

Usually, a WFST has an initial weight. However, in the first embodiment, the initial weight of a WFST is equal to zero. That is because a WFST can be modified in advance in such a way that a single transition and a single state are added with respect to a single initial state and are assigned to a transition having the initial weight added thereto. If a pseudo code is to be written by taking into account the initial weight, then the initial weight can be added to an accumulation weight of tokens that is created at the first line.

Given below is the explanation of the operation performed at each line. The decoder 20 performs the operations written at each line of the pseudo code illustrated in FIG. 4 in a sequential manner starting from the first line.

At the first line, the decoder 20 initializes the set of tokens. Herein, as an example, the set of tokens can be implemented using an array, a singly linked list, or a binary tree. Meanwhile, since overlapping elements cease to exist at the ninth line, the decoder 20 may or may not delete the overlapping elements at the first line. Moreover, the decoder 20 initializes the frame number f to zero.

At the second line, the decoder 20 determines whether or not the input of signals is completed. If the input of signals is completed, then the decoder 20 proceeds to the operation at the 16-th line for outputting the result. However, if any signal is yet to be processed, then the decoder 20 performs the operations from the third line to the 15-th line.

At the third line, the decoder 20 receives, from the feature extractor 12, the feature of the input signal; and substitutes the feature into v. In the pseudo code, the feature is written as feature vector.

At the fourth line, the decoder 20 initializes the set T of tokens to an empty set.

The fifth line indicates that the operations from the sixth line to the eighth line are performed for each token included in the set L[f].

The sixth line indicates that the operations at the seventh and eighth lines are performed for the outgoing transitions from the state that is assigned with the token t.

A function "outgoing" returns a set of outgoing transitions from the state state(t) in the case in which the WFST does not include $\epsilon$ transitions.

However, when the WFST includes $\epsilon$ transitions, the function "outgoing" returns a set $E_n$ that includes the outgoing transitions from the state state(t) excluding the $\epsilon$ transitions and includes the transitions which can be reached by following $\epsilon$ transitions from the state state(t) and which do not have $\epsilon$ as the input symbol. If there is a plurality of paths to reach such a transition, then the function "outgoing" selects only one path in which the value obtained by accumulating the weights is the greatest. In order to search for the path in which the value obtained by accumulating the weights is the greatest, it is possible to implement, for example, the Dijkstra algorithm or the Bellman-Ford algorithm.

Moreover, the function "outgoing" modifies the weight of each transition $e_n$ included in the set $E_n$ into a value obtained by accumulating the weights in the path from the state state(t) to the transition $e_n$ (including the transition $e_n$). Moreover, the function "outgoing" modifies the output symbol of each transition $e_n$ included in the set $E_n$ into a symbol string in which the output symbols in the path from the state state(t) to the transition $e_n$ (including the transition $e_n$) are linked.

In the case in which the paths up to the transition $e_n$ include a plurality of output symbol strings all of which are to be kept, the function "outgoing" can be configured in the following manner. Assume that $x_n$ represents an output symbol string in a particular path. Moreover, assume that $w_n$ represents a value obtained by adding the greatest weight, from among the weights in the paths assigned with the same output symbol string as the output symbol string $x_n$, and the weight of the transition $e_n$. Then, in the set to be returned as the processing result, the function "outgoing" adds a transition having the output symbol string $x_n$, having the weight $w_n$, and having the remaining elements to be same as the transition $e_n$.

At the seventh line, the decoder 20 creates a new token $t_{new}$. The state assigned to the token $t_{new}$ is the next state of the transition e. Moreover, the accumulation score of the token $t_{new}$ is a value obtained by adding the weight of the transition e to the accumulation score of the token t. Furthermore, the signal score of the token $t_{new}$ is zero.

At the eighth line, the decoder 20 adds the token $t_{new}$, which is created at the seventh line, to the set T of tokens.

At the ninth line, if there is a plurality of tokens having the same state assigned thereto, the decoder 20 keeps only one token having a suitable accumulation score and eliminates the remaining tokens. In this example, the decoder 20 keeps only one token having the best accumulation score. Upon the completion of the operation at the ninth line, the number of tokens having a single state assigned thereto is at most one.

The 10-th line indicates that the operations at the 11-th and 12-th lines are performed for each token t included in the set T of tokens.

At the 11-th line, the decoder 20 calculates a signal score using a score function "am_score", which takes a feature as the first argument and takes a score identifier as the second argument, and returns a signal score. Then, the decoder 20 substitutes the value calculated using the score function "am_score" in the signal score tam_score(t) of the token t.

A function "incoming" returns a set of incoming transitions from the state state(t). There is a possibility that a plurality of transitions can be obtained using the function "incoming". In the WFST used in the first embodiment, the input symbols of all transitions are identical, and only a single input symbol (a single score identifier) is sent to the score function. Meanwhile, if the input symbols of the incoming transitions are associated in advance to the respective states, then the decoder 20 can refer to the association and obtain the same result without having to perform the process of input(incoming(state)).

At the 12-th line, the decoder 20 adds the signal score tam_score(t), which is calculated at the 11-th line, to the accumulation score tacc_score(t) of the token t.

The operations at the 13-th to 15-th lines indicate pruning of tokens and adding of the post-pruning tokens as nodes in a lattice.

At the 13-th line, from among the accumulation scores of the tokens included in the set T of tokens, the decoder 20 substitutes the best accumulation score in $w_{max}$.

At the 14-th line, the decoder 20 increments the frame number f by one.

At the 15-th line, the decoder 20 eliminates, from the set T of tokens, such tokens which hold the accumulation score equal to or smaller than the value obtained by subtracting $w_{beam}$ from $w_{max}$. Moreover, the decoder 20 adds the remaining tokens as nodes in the set L[f]. Herein, $w_{beam}$ can either be a fixed value set in advance or a value calculated in such a way that the number of tokens is within a certain number. Meanwhile, the method of performing pruning according to the number of tokens is called histogram pruning. In the first embodiment, the tokens and the nodes are treated as same objects. However, if a node can hold the information on the accumulation score, the signal score, and the assigned state that is included in a token; then the tokens and the nodes need not be treated as same objects.

The operations from the 16-th line to the 25-th line indicate obtaining a first-ranked result from the lattice.

At the 16-th line, the decoder 20 initializes a variable $x_q$, which is used to hold an input symbol string, with an empty string.

At the 17-th line, the decoder 20 performs the following operation with respect to each node t included in the set L[f] and substitutes the result in $\Theta$.

Firstly, the decoder 20 calls a function "eps" with the argument in the form of the state assigned with the node t. The function "eps" finds a state q that can be reached from the state assigned with the node t by following only $\epsilon$ transitions, finds a weight w of the path having the greatest weight from among the paths to the state q, and finds an output symbol string o of the path having the greatest weight; and returns them as a 3-tuple (q, w, o). In the 3-tuples returned by the function "eps", a 3-tuple including the state assigned with the node t is also included. When the state q is the state assigned with the node t, then the weight w is zero and the output symbol string o is $\epsilon$. Once the result is returned from the function "eps", the decoder 20 adds a 3-tuple (t, w+ρ(q), o) in $\Theta$ only when the state q is a final state. When the processes are performed for all nodes t, the nodes that reach the final states are recorded as part of 3-tuples in $\Theta$. Meanwhile, the configuration can be such that the determination of whether or not a state is a final state is performed in the function "eps" so as to ensure that the states q returned by the function "eps" are all final states.

At the 18-th line, the decoder 20 determines whether or not $\Theta$ is an empty set. If $\Theta$ is an empty set, then there is no path reaching a final state. In that case, at the 19-th line, the decoder 20 returns an empty string as the recognition result. That marks the end of the processes of the pseudo code.

On the other hand, if $\Theta$ is not an empty set, then the system control proceeds to the operation at the 20-th line. Of the nodes recorded in $\Theta$, the decoder 20 substitutes, in $t_{best}$, the node having the greatest value obtained by adding the weight of the best path, from among the paths starting from the states assigned with the nodes to a final state, and the accumulation score of the nodes. Moreover, the decoder substitutes, in $x_w$, an output symbol string recorded in the same 3-tuple as the concerned node, that is, an output symbol string obtained by joining the output symbol strings present in the best path from among the paths starting from the states assigned with the nodes to a final state.

The 21-st line indicates that the operations from the 22-nd line to the 24-th line are performed in a repeated manner while the frame number f is greater than zero.

At the 22-nd line, the decoder 20 decrements the frame number by one.

At the 23-rd line, if t represents a node included in the set L[f], the decoder 20 substitutes the node t and the transition e, which satisfy the following two conditions, into $t_{best}$ and $e_{best}$, respectively.

The first condition is that the next state of the transition obtained using the function "outgoing" from the state assigned with the node t matches with the state assigned with the node $t_{best}$.

The second condition is that the value obtained by adding the weight of the transition created using the function "outgoing", the accumulation score of the node t, and the signal score of the node $t_{best}$ is equal to the accumulation score of the node $t_{best}$. In other words, the decoder 20 again performs the calculation at the seventh line and the 12-th line and searches for such a node t and such a transition e that enable replication of the node $t_{best}$. Since the nodes do not hold a back pointer unlike in the conventional technology, the decoder 20 needs to perform such recalculation. In the case in which there is a plurality of nodes and a plurality of transitions satisfying the two conditions mentioned above, the decoder 20 can select any one node and any one transition. That is because, regardless of the selected node and the selected transition, the best accumulation score is achieved.

At the 24-th line, the decoder 20 joins the input symbol of the transition $e_{best}$, which is obtained at the 23-rd line, anterior to the input symbol string $x_q$. Moreover, the decoder 20 joins the output symbol of the transition $e_{best}$, which is obtained at the 23-rd line, anterior to the output symbol string $x_w$. Herein, at the 24-th line, each dot "•" represents joining of a symbol anterior thereto and posterior thereto.

When the operations are completed up to the frame number f=0, that is, up to the first node; the decoder 20 proceeds to the operation at the 25-th line. Then, at the 25-th line, the decoder 20 returns the input symbol string $x_q$ and the output symbol string $x_w$ as the result of speech recognition. Meanwhile, if the input symbols represent the states of an HMM, then the input symbol string $x_q$ becomes a sequence of states of the HMM.

In the pseudo code described above, using the frame numbers f; the sets of nodes are identified with L[f]. However, instead of using the frame numbers, the sets of nodes can be held as elements of a singly linked list or a doubly linked list. At the 21-st line to the 24-th line, the operations are performed by decrementing the frame number f by one. Hence, if a singly linked list or a doubly linked list is used, then the decoder 20 can perform the same operations by tracing each node in the list.

Example of Operations

Figure 5:
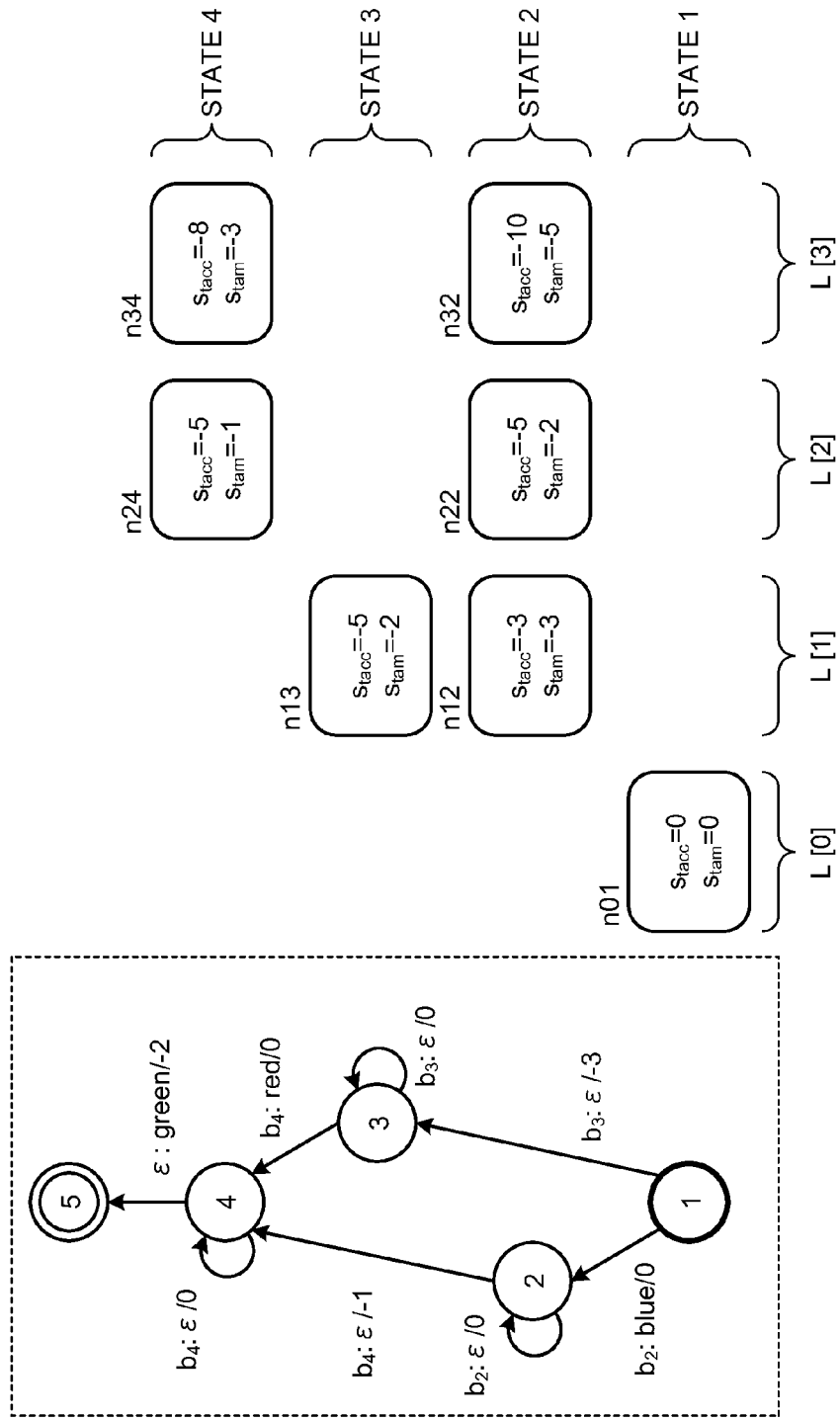
FIG. 5 is a transition diagram illustrating the processes performed in the decoder according to the first embodiment.

FIG. 5 is a transition diagram illustrating an example of the processes performed in the decoder 20 according to the first embodiment. Herein, assuming that the decoder 20 performs processes according to the pseudo code illustrated in FIG. 4, the specific explanation is given for the manner in which a lattice is created and the manner in which the best path is found using the lattice and the result is output.

In FIG. 5, the left side portion enclosed within dashed lines represents a WFST searched by the decoder 20. In that WFST, circles represent states, and the numbers written in the circles represent state numbers. Moreover, the circle drawn with a heavy line represents an initial state. Furthermore, the double-lined circle represents a final state. Moreover, arrows represent transitions. The character string written close to each arrow is separated using ":" and "/". Herein, on the left side of ":" is written the input symbol. Moreover, between ":" and "/" is written the output symbol. Furthermore, on the right-hand side of "/" is written the weight.

In FIG. 5, the right side portion not enclosed within the dashed lines represents a lattice that is obtained as a result of inputting the feature thrice. The rectangles having rounded corners represent nodes. On the top left part of each node, a label such as n12 is written. The nodes are illustrated in order of addition from the left side to the right side. The assigned states are illustrated along the vertical direction of the node positions. From the bottom portion, a state 1 to a state 4 are illustrated in that order.

Inside each node, $s_{tacc}$ represents the accumulation score, and $s_{tam}$ represents the signal score. If t represents a token that is not yet added as a node in the lattice, then $s_{tacc}$ corresponds to tacc_score(t) and $s_{tam}$ corresponds to tam_score(t). Meanwhile, in the example illustrated in FIG. 5, $w_{beam}$ is set to five.

At the first line of the pseudo code illustrated in FIG. 4, the decoder 20 adds a node n01 to the set L[0]. At that time, the accumulation score as well as the signal score is equal to zero. At the third line, the decoder 20 receives the feature for the first time. At the fourth line, the decoder 20 adds an empty set to the set T. Consequently, T={ } holds true.

From the fifth line to the eighth line, the decoder 20 propagates the tokens according to the feature received in the first instance. Since the previous token is stored as a node in the set L[0], it corresponds to the node n01. Thus, from the fifth line to the eighth line, the tokens are propagated to the state 2 and the state 3 via the outgoing transitions from the state 1 of the WFST assigned with the node n01. Moreover, to the accumulation score is added the weights of the transitions that have been passed. Consequently, the token assigned to the state 2 has the accumulation score "0". Similarly, the token assigned to the state 3 has the accumulation score "−3".

At the ninth line, since a plurality of tokens is not assigned to the same state, the decoder 20 does not perform any processes.

From the 10-th line to the 12-th line, the decoder 20 calculates the signal scores and the accumulation scores, and stores them in the tokens. Assume that the signal scores calculated from the feature, which is received in the first instance, are am_score (v, $b_2$)=−3 and am_score (v, $b_3$)=−2. In that case, the accumulation score of the token assigned to the state 2 becomes equal to −3; while the accumulation score of the token assigned to the state 3 becomes equal to −5. Moreover, the signal score of the token assigned to the state 2 becomes equal to −3; while the accumulation score of the token assigned to the state 3 becomes equal to −2.

During the operations from the 13-th line to the 15-th line, the decoder 20 performs pruning of tokens. However, since $w_{beam}$=5 holds true, none of the tokens is pruned at this point of time.

At the 15-th line, the decoder 20 adds the tokens as nodes in the set L. Consequently, L[1]={(2, 3, −3), (3, −5, −2)} holds true. With reference to FIG. 5, nodes n12 and n13 are added to the set L[1].

Then, returning to the third line, the decoder 20 receives the feature for the second time. From the fourth line to the eighth line, the decoder 20 propagates the tokens according to the feature received in the second instance. Since the nodes n12 and n13 are stored in the set L[1], those nodes are treated as tokens. The tokens are propagated according to the processing of the function "outgoing", and T={(2, −3, 0), (3, −5, 0), (4, −4, 0), (4, −5, 0)} holds true.

At the ninth line, if there is a plurality of tokens assigned to the same state, the decoder 20 eliminates the tokens except the token having the greatest accumulation score. Consequently, T={(2, −3, 0), (3, −5, 0), (4, −4, 0)} holds true.

From the 10-th line to the 12-th line, the decoder 20 calculates the signal scores and the accumulation scores, and stores them in the tokens. Assume that the signal scores calculated from the feature, which is received in the second instance, are am_score (v, $b_2$)=−2, am_score (v, $b_3$)=−5, and am_score (v, $b_4$)=−1. In that case, T={(2, −5, 2), (3, −10, −5), (4, −5, 1)} holds true.

At the 13-th line, the decoder 20 calculates the greatest accumulation score for the purpose of token pruning. Herein, the greatest accumulation score $w_{max}$ is −5, and $w_{max}$−$w_{beam}$ becomes equal to −10. Hence, the token (3, −10, −5) does not satisfy the condition at the 15-th line and gets pruned. Now, two tokens (2, −5, −2) and (4, −5, −1) remain. Then, the decoder 20 adds those two tokens as nodes in the set L. Consequently, L[2]={(2, −5, −2), (4, −5, −1)} holds true. With reference to FIG. 5, nodes n22 and n24 are added to the set L[2].

Then, returning to the third line, the decoder 20 receives the feature for the third time. From the fourth line to the eighth line, the decoder 20 propagates the tokens according to the feature received in the third instance. From the state 4, the input symbol has an ϵ transition as the outgoing transition. However, there is no outgoing transition from the state 5. Hence, when the state 4 is fed to the function "outgoing", the only transition that is obtained is the self-transition of the state 4. Thus, as the post-propagating tokens, T={(2, −5, 0), (4, −6, 0), (4, −5, 0)} holds true.

At the ninth line, since there are two tokens in the state 4, the decoder 20 keeps the token having a suitable accumulation score. As a result, T={(2, −5, 0), (4, −5, 0)} holds true.

From the 10-th line to the 12-th line, the decoder 20 calculates the signal scores and the accumulation scores, and stores them in the tokens. Assume that the signal scores calculated from the feature, which is received in the third instance, are am_score (v, $b_2$)=−5 and am_score (v, $b_4$)=−3. In that case, T={(2, −10, −5), (4, −8, −3)} holds true.

From the 13-th line to the 15-th line, none of the tokens are pruned. Consequently, the remaining two tokens are added as nodes in the set L. Thus, L[3]={(2, −10, −5), (4, −8, −3)} holds true. With reference to FIG. 5, nodes n32 and n34 are added to the set L[3].

As a result of performing the processes described above, the input of the feature for three times is completed, and the decoder 20 then obtains the recognition result.

At the 17-th line, Θ={((4, −8, −3), −2, green)} holds true. The state 2 is not a final state, and it is not possible to reach a final state by following only ϵ transitions. Therefore, the node n32 is not included in Θ. Since Θ is not an empty set, the operation at the 20-th line is performed. However, since Θ includes only one element, $t_{best}$=(4, −8, −3) and $x_w$=green holds true.

At this stage, f=3 holds true. Thus, at the 22-nd line, the frame number f becomes equal to two. At the 23-rd line, such nodes are found which have an outgoing transition in the form of a transition joined to the token $t_{best}$ from a node included in the set L[2]. Herein, the node n24 and the self-transition of the state 4 are found. Thus, n(e)=state 4=state ($t_{best}$) holds true, and tacc_score (n24)+w(e)+tam_score ($t_{best}$)=−5+0−3=−8=tacc_score ($t_{best}$) holds true. Consequently, $t_{best}$=n24 and $e_{best}$=self-transition of the state 4 holds true. Therefore, at the 24-th line, $x_q$=$b_4$ and $x_w$=green holds true.

Subsequently, returning to the 22-nd line, f=1 holds true. Then, at the 23-rd line, a transition occurs from $t_{best}$=n12 and $e_{best}$=state 2 to the state 4. Thus, at the 24-th line, $x_q$=$b_4b_4$ and $x_w$=green holds true.

Then, returning to the 22-nd line, f=0 holds true. Then, at the 23-rd line, a transition occurs from $t_{best}$=n01 and $e_{best}$=state 1 to the state 2. Thus, at the 24-th line, $x_q$=$b_2b_4b_4$ and $x_q$=blue green holds true.

Subsequently, at the 25-th line, the decoder 20 returns the final result of $x_q$=$b_2b_4b_4$ and $x_w$=blue green as the recognition result.

Hardware Configuration

Figure 6:
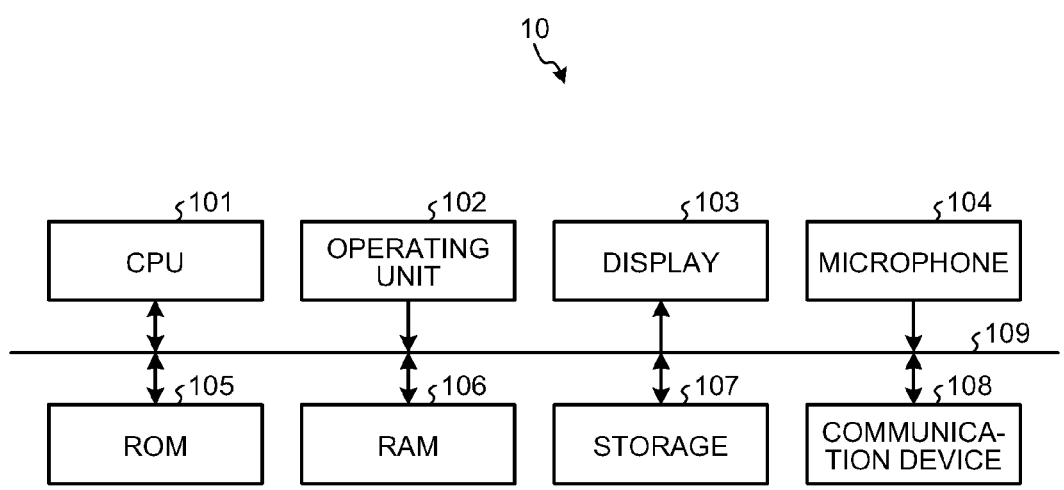
FIG. 6 is a hardware block diagram of the pattern recognition device according to the first embodiment.

FIG. 6 is a hardware block diagram of the pattern recognition device 10 according to the first embodiment. The pattern recognition device 10 includes a central processing unit (CPU) 101, an operating unit 102, a display 103, a microphone 104, a read only memory (ROM) 105, a random access memory (RAM) 106, a storage 107, a communication device 108, and a bus 109 that interconnects each of these constituent elements.

The CPU 101 uses a predetermined area in the RAM 106 as the work area and performs various processes in cooperation with various computer programs stored in advance in the ROM 105 or the storage 107; and performs an overall control of the constituent elements (the feature extractor 12 and the decoder 20) of the pattern recognition device 10. Moreover, in cooperation with the computer programs stored in advance in the ROM 105 or the storage 107, the CPU 101 implements the operating unit 102, the display 103, the microphone 104, and the communication device 108.

The operating unit 102 is an input device such as a mouse or a keyboard that receives instruction signals in the form of information input by a user by operating the operating unit 102, and outputs the instruction signals to the CPU 101.

The display 103 is a display device such as a liquid crystal display (LCD). Based on display signals received from the CPU 101, the display 103 displays a variety of information. For example, the display 103 displays the recognition result output by the decoder 20. Meanwhile, if the recognition result is output to the communication device 108 or the storage 107, then the pattern recognition device 10 may not include the display 103.

The microphone 104 is a device that receives input of speech signals. In the case in which pattern recognition is to be done with respect to prerecorded speech signals or with respect to speech signals input from the communication device 108, the pattern recognition device 10 may not include the microphone 104.

The ROM 105 is used to store, in a non-rewritable manner, computer programs and a variety of setting information to be used in controlling the pattern recognition device 10. The RAM 106 is a volatile storage medium such as a synchronous dynamic random access memory (SDRAM). The RAM 106 serves as the work area of the CPU 101. More particularly, the RAM 106 functions as a buffer for temporarily storing various variables and parameters used by the pattern recognition device 10.

The storage 107 is a rewritable recording device such as a storage made of a semiconductor such as a flash memory, or a storage medium capable of magnetic or optical recording. The storage 107 is used to store the computer programs and a variety of setting information used in controlling the pattern recognition device 10. Moreover, the storage 107 is used to store computer programs and a variety of setting information used in controlling the pattern recognition device 10. Moreover, the storage 107 is also used to store in advance the parameters of the score function and a variety of WFST-related information.

The communication device 108 communicates with an external device, and is used in receiving input of speech signals and in outputting the recognition result. In the case in which pattern recognition is to be done with respect to prerecorded speech signals or speech signals input from the microphone 104 and in which the recognition result is to be output to the display 103 or the storage 107, the pattern recognition device 10 may not include the communication device 108.

Meanwhile, in the case of performing pattern recognition of handwritten characters, the pattern recognition device 10 further includes a handwriting input device. Alternatively, in the case of performing optical character recognition (OCR), the pattern recognition device 10 further includes a scanner or a camera. Still alternatively, in the case of performing gesture recognition, hand signal recognition, or sign language recognition; the pattern recognition device 10 further includes a video camera that imports dynamic image signals. In these cases, since speech signals are not required in pattern recognition, the pattern recognition device 10 may not include the microphone 104.

The computer programs executed in the pattern recognition device 10 according to the first embodiment are recorded as installable or executable files in a computer-readable recording medium such as a compact disk read only memory (CD-ROM), a flexible disk (FD), a compact disk readable (CD-R), or a digital versatile disk (DVD), which may be provided as a computer program product.

Alternatively, the computer programs executed in the pattern recognition device 10 according to the first embodiment can be saved as downloadable files on a computer connected to the Internet or can be made available for distribution through a network such as the Internet. Alternatively, the computer programs executed in the pattern recognition device 10 according to the first embodiment can be stored in advance in a ROM or the like.

The computer programs executed in the pattern recognition device 10 according to the first embodiment contain a module for the feature extractor 12 and the decoder 20 (the token storage 31, the token operating unit 32, the score calculator 33, the duplication eliminator 34, the pruner 35, the lattice storage 36, the node adder 37, and the connection detector 38). The CPU 101 (the processor) reads the computer programs from a storage medium and executes them so that each constituent element is loaded in a main storage device. As a result, the feature extractor 12 and the decoder 20 (the token storage 31, the token operating unit 32, the score calculator 33, the duplication eliminator 34, the pruner 35, the lattice storage 36, the node adder 37, and the connection detector 38) are generated in the main storage device. Meanwhile, the feature extractor 12 and the decoder 20 can be configured entirely or partially using hardware.

Effect

As described above, after the search of a digraph (such as a WFST) is completed, the decoder 20 according to the first embodiment find outs, while referring to the digraph, the path having the best accumulation score from a lattice and generates an output symbol string. Hence, while searching a digraph, the decoder need not generate and destroy back pointers indicating the connection relationship among the nodes. That enables achieving reduction in the calculation cost of the search operation, and achieving reduction in the storage area required to manage the back pointers.

Second Embodiment

Figure 7:
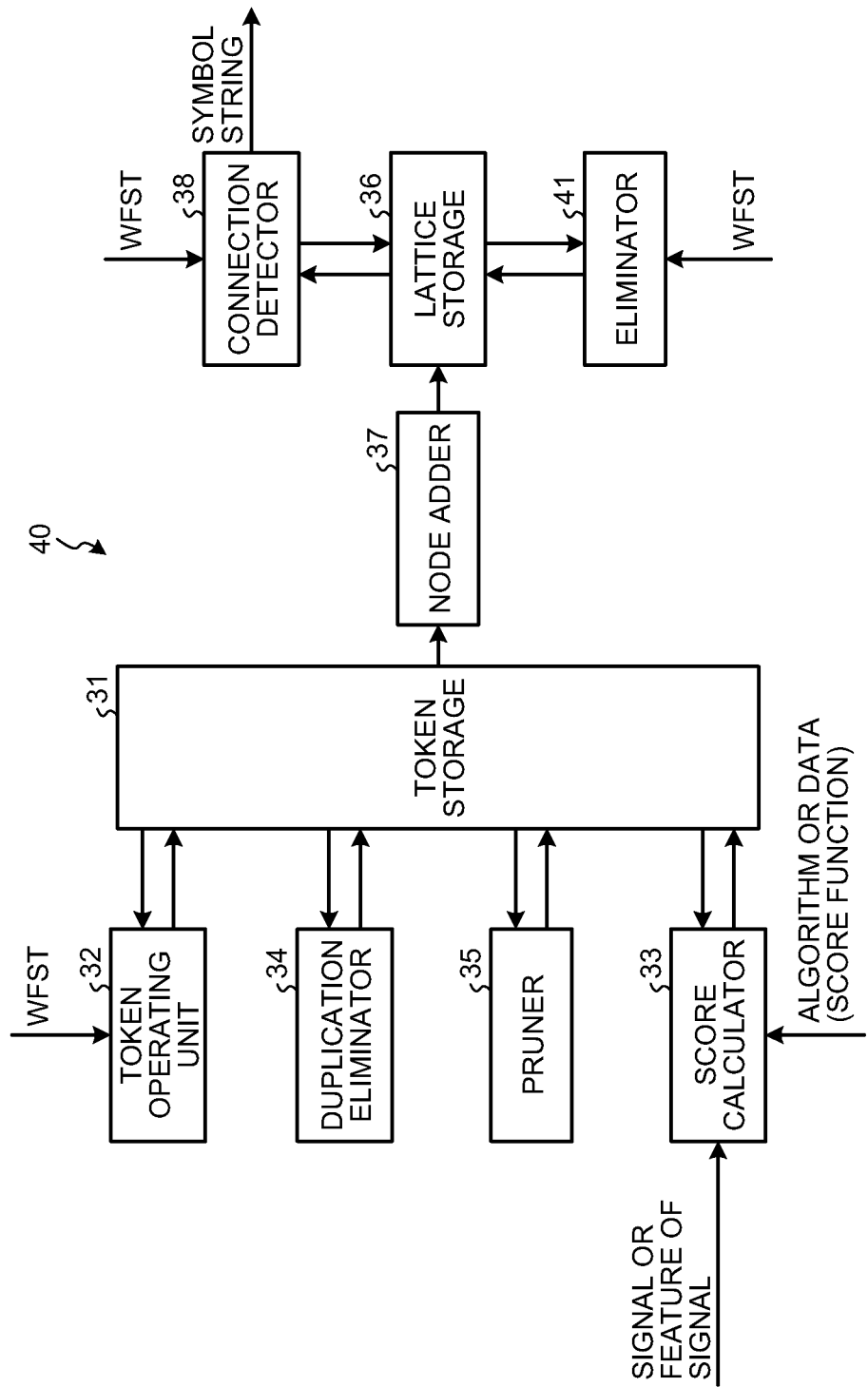
FIG. 7 is a block diagram of a decoder according to a second embodiment.

FIG. 7 is a block diagram of a decoder 40 according to a second embodiment. In the pattern recognition device 10, the decoder 40 according to the second embodiment is installed in place of the decoder 20 according to the first embodiment. The configuration of the decoder 40 and the computer programs executed therein are substantially identical to the decoder 20 according to the first embodiment. Hence, regarding the identical functions and configuration, same reference numerals are used in the drawings. Moreover, the detailed explanation of the identical functions and configuration is not repeated. That is, the explanation is given only about the differences.

The decoder 40 further includes an eliminator 41. While searching the paths, the decoder 40 performs pruning and eliminates the tokens having the accumulation score worse than a certain score. Thus, during the search, the nodes for which the corresponding tokens are already eliminated due to pruning remain in the lattice storage 36. That is, in the lattice stored in the lattice storage 36, the nodes in such paths in which the node added in the last frame cannot be reached are also held. In that regard, every time a predetermined number of signals are input or every time the feature of a predetermined number of signals is input, the eliminator 41 eliminates unnecessary nodes from the lattice.

More particularly, the eliminator 41 refers to the WFST and, of the nodes added in the lattice in the i-th instance, eliminates such nodes from which none of the nodes added in the i+1-th instance are reachable. Herein, i is an integer equal to or greater than one. Thus, the eliminator 41 can eliminate, from the lattice, such nodes which are not linked to the nodes included in the next lattice (i.e., eliminates nodes in the paths that end midway).

Herein, a node added in the i-th instance is treated as a first node, and a node connected to the first node and added in the i+1-th instance is treated as a second node. Then, except for the path in which the accumulation score associated to the second node is identical to the value obtained by adding the accumulation score associated to the first node, the signal score associated to the second node, and the weights in the path connecting the first node and the second node; the eliminator 41 can eliminate the nodes in the other paths. As a result, the eliminator 41 can eliminate such a node from the lattice that even though is linked to a node included in the next lattice is not linked to the best path. In the case of searching a digraph not having the weights attached thereto, the eliminator 41 does not perform processes related to the weights, and calculates the accumulation scores with the weights set to zero.

Alternatively, as an example, every time the feature of signals is input, the eliminator 41 can eliminate the unnecessary nodes. Still alternatively, after every predetermined number of times, the eliminator 41 can eliminate the unnecessary nodes. Still alternatively, when the empty space in the storage area decreases to or below a certain level, the eliminator 41 can eliminate the unnecessary nodes.

FIG. 8 is a diagram illustrating the pseudo code of a function prune($f_{begin}$, $f_{end}$) that represents the process of eliminating the unnecessary nodes performed by the decoder 40 according to the second embodiment.

During the operations from the third line to the 15-th line of the pseudo code illustrated in FIG. 4, the decoder 40 according to the second embodiment executes the function prune($f_{begin}$, $f_{end}$) when a condition is satisfied that the operations from the third line to the 15-th line of the pseudo code illustrated in FIG. 4 are repeated for a predetermined number times (including once) or that the empty space in the storage area decreases to or below a certain level.

Herein, $f_{begin}$ represents the first frame number in the range of frames for eliminating unnecessary frames. Moreover, $f_{end}$ represents the last frame number in the range of frames for eliminating unnecessary frames. For example, in the case in which he processing of the feature has been done for 50 frames and in which the unnecessary frames in the range from the 30-th frame to the 50-th frame are to eliminated; the decoder 40 calls the function prune(30, 50). Meanwhile, regardless of the point of time at which the function prune(30, 50) is called during the operations from the third line to the 15-th line of the pseudo code illustrated in FIG. 4, the operations from the third line to the 15-th line are not affected.

The first line indicates that the decoder 40 decrements i one by one in a sequential manner from the frame number $f_{end}-1$ to the frame number $f_{begin}$, and performs the process at the second line after every decrement.

At the second line, the decoder 40 updates the set L[i] with a set of nodes satisfying the following condition.

Assume that t represents the node (a first node) that is added in the lattice in response to the input of the feature of signals in the i-th frame (where i is an integer equal to or greater than one); and assume that $t_n$ represents the node (a second node) that is added in the lattice in response to the input of the feature of signals in the i+1-th frame. In this case, regarding the nodes satisfying the condition, the next state of the outgoing transition e from the state assigned to the node t is identical to any one of the states assigned to the node $t_n$, and the value obtained by adding the accumulation score of the node t, the weight of the transition e, and the signal score of the node $t_n$ is identical to the accumulation score of the node $t_n$.

FIG. 9 is a diagram illustrating a modification example of the second line of the function prune($f_{begin}$, $f_{end}$) that represents the process of eliminating the unnecessary nodes performed by the decoder 40 according to the second embodiment. In the pseudo code illustrated in FIG. 8, in the case of returning only the result of the best path, the decoder 40 can eliminate the unnecessary nodes. However, in the case of including the result other than the best path in the lattice and then returning the lattice, the second line can be modified as illustrated in the pseudo code in FIG. 9. That is, the decoder 40 updates the set L[i] with the set of nodes satisfying the following condition.

Assume that t represents the node (a first node) that is added in the lattice in response to the input of the feature of signals in the i-th frame; and assume that $t_n$ represents the node (a second node) that is added in the lattice in response to the input of the feature of signals in the i+1-th frame. In this case, regarding the nodes satisfying the condition, the next state of the outgoing transition e from the state assigned to the node t is identical to any one of the states assigned to the node $t_n$.

As described above, while searching a digraph, the decoder 40 according to the second embodiment eliminates the unnecessary nodes that have been added in a lattice. As a result, the decoder 40 according to the second embodiment can achieve reduction in the usage amount of the storage area during the search of a digraph.

Third Embodiment

Figure 10:
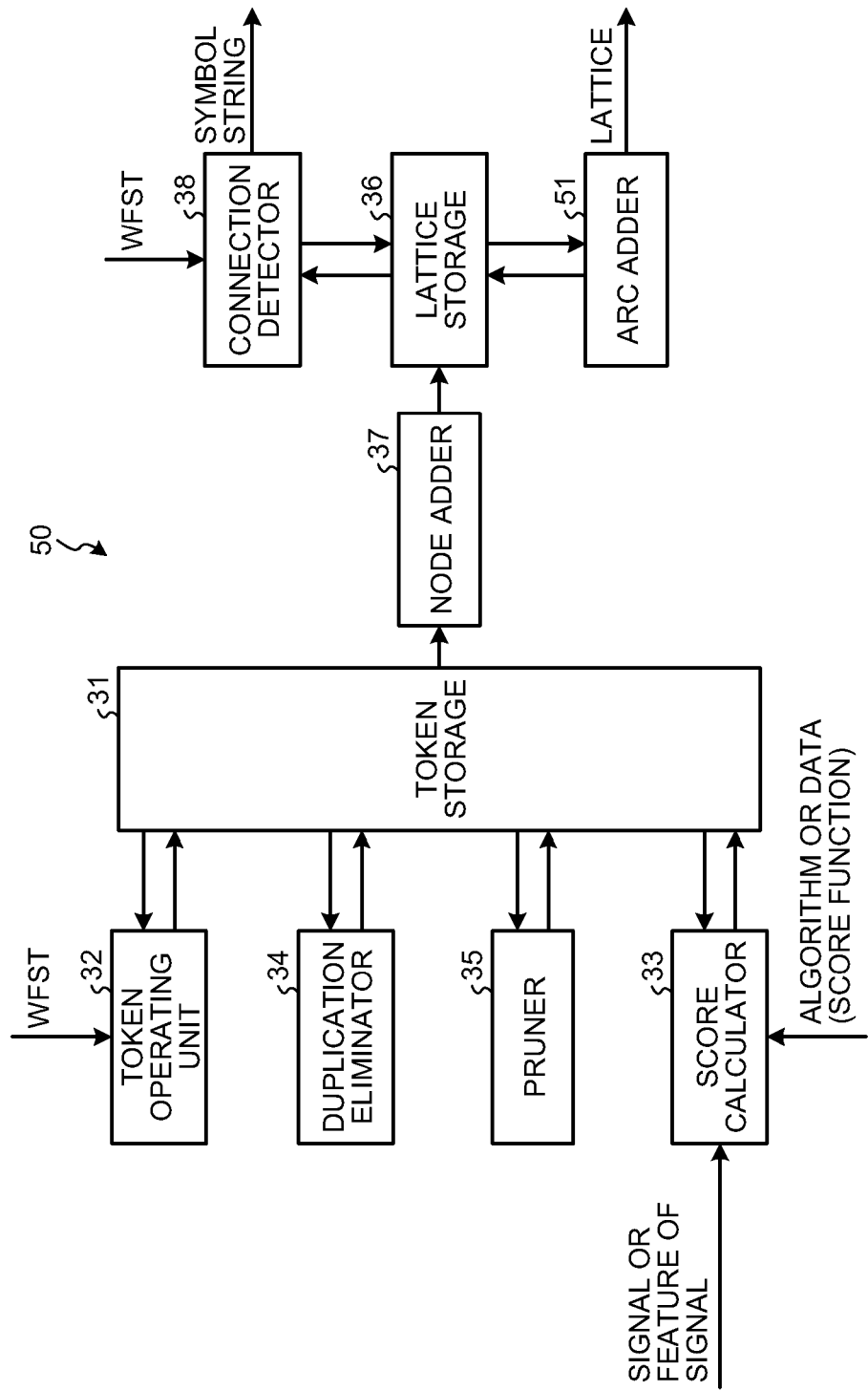
FIG. 10 is a block diagram of a decoder according to a third embodiment.

FIG. 10 is a block diagram of a decoder 50 according to a third embodiment. In the pattern recognition device 10, the decoder 50 according to the third embodiment is installed in place of the decoder 20 according to the first embodiment. The configuration of the decoder 50 and the computer programs executed therein are substantially identical to the decoder 20 according to the first embodiment. Hence, regarding the identical functions and configuration, same reference numerals are used in the drawings. Moreover, the detailed explanation of the identical functions and configuration is not repeated. That is, the explanation is given only about the differences.

The decoder 50 further includes an arc adder 51 that adds an arc in the lattice after the node adder 37 has finished adding the nodes. That is, the arc adder 51 adds arcs in the lattice after the search of the WFST is completed. In this case, the arc adder 51 adds, in the lattice, arc from the nodes added in the i-th instance (where i is equal to or greater than one) in the lattice to the nodes added in the i+1-th instance in the lattice.

Then, the arc adder 51 outputs the lattice, in which arcs have been added, to the outside. With that, the arc adder 51 can output a recognition result that has a use other than obtaining the best path. Meanwhile, the decoder 50 can be configured to also include the eliminator 41 illustrated in FIG. 7.

FIG. 11 is a diagram illustrating a pseudo code for the processes performed in the decoder 50 according to the third embodiment. Herein, the pseudo code illustrated in FIG. 11 is executed after the execution of the pseudo code illustrated in FIG. 4. Alternatively, instead of performing the operations from the 16-th line to the 25-th line of the pseudo code illustrated in FIG. 4, the decoder 50 can perform the operations from the first line to the 21-st line of the pseudo code illustrated in FIG. 11.

Herein, D represents a set of nodes of a lattice that includes arcs. Moreover, R represents a set of arcs. In the third embodiment, the nodes are assigned with accumulation scores. Moreover, an arc is assigned with the input symbols of the transitions, excluding ε transitions, passed while processing a single frame as well as assigned with an output symbol string in which the output symbols of the passed transitions are joined. Furthermore, an arc is assigned with a value that is added to the accumulation score while processing a single frame, that is, assigned with the value obtained by adding the weights and the signal scores of the passed transitions. This score is called a difference score.

An arc is made of a 5-tuple (previous state, next state, input symbol, output symbol, difference score). In the third embodiment, the nodes included in the lattice L are reused. The nodes included in the lattice L are assigned with the states of the WFST. In case the states of the WFST are not required, then new nodes can be created by removing the WFST states from the nodes.

At the first line of the pseudo code illustrated in FIG. 11, the decoder 50 initializes the frame number f with the value of the frame number f at the point of time of completion of the operations from the second line to the 15-th line of the pseudo code illustrated in FIG. 4. Moreover, the decoder 50 creates a new node $t_f$ that represents the end of the lattice. That is, the node $t_f$ represents the end node.

At the second line, the decoder 50 initializes the set D of nodes to an empty set. Moreover, the decoder 50 initializes the set R of arcs to an empty set.

At the third line, the decoder 50 performs an identical operation to the operation performed at the 17-th line of the pseudo code illustrated in FIG. 4.

At the fourth line, if Θ is not an empty set, then the decoder 50 proceeds to the operation at the sixth line. However, if Θ is an empty set, then the decoder 50 returns an empty lattice as the recognition result at the fifth line. Meanwhile, in the case of generating a lattice in which arcs are added irrespective of the fact that none of the nodes reaches a final state, it serves the purpose if the decoder 50 does not include the condition q∈F, which is the condition for creating Θ, at the third line of the pseudo code.

At the sixth line, the decoder 50 assigns the best accumulation score to the node $t_f$. Meanwhile, in this example, the greatest accumulation score is the best accumulation score.

At the seventh line, the decoder 50 adds the node $t_f$ in the set D.

The eighth line indicates that the operation at the ninth line is performed with respect to each element of Θ.

At the ninth line, the decoder 50 creates an arc from the node t to the node $t_f$. Then, the decoder 50 adds the created arc in the set R. For the added arc, the input symbol is an empty string; the output symbol string is o; and the difference score is w. Moreover, the decoder 50 adds the node t in the set D.

At the 10-th line, the decoder 50 substitutes the nodes included in Θ in the set T.

The 11-th line indicates that the operations from the 12-th line to the 20-th line are performed in a repeated manner until the frame number f becomes zero.

At the 12-th line, the decoder 50 decrements the frame number f by one.

At the 13-th line, of the nodes included in the set L[f], the decoder 50 substitutes the nodes satisfying the following condition in a set $T_p$. Herein, of the nodes included in the set L[f], the nodes satisfying the condition are the nodes for which the next state of the transition obtained using the function "outgoing", which takes the state assigned with the node t as the argument, is identical to any one of the states assigned with the nodes included in the set T.

At the 14-th line, the decoder 50 adds the set $T_p$ to the set D.

The 15-th line indicates that, for each node t included in the set $T_p$, the operations from the 16-th line to the 19-th line are performed.

The 16-th line indicates that, for each transition e obtained using the function "outgoing" that takes the state assigned to the token t as the argument, the operations from the 17-th line to the 19-th line are performed.

The 17-th line indicates that, upon determining whether or not the next state of the transition e is identical to any one of the states assigned with the nodes included in the set T, the operations at the 18-th line and the 19-th line are performed only if an identical state is present.

At the 18-th line, the decoder 50 substitutes, in the node $t_n$, the node assigned to the state found to be identical at the 17-th line.

At the 19-th line, the decoder 50 adds the arc from the node t to the node $t_n$ in the set R. Regarding the added arc, the input symbol is the input symbol of the transition e; the output symbol string is the output symbol string of the transition e; and the difference score is the value obtained by adding the weight of the transition e and the signal score of the node $t_n$.

At the 20-th line, the decoder 50 substitutes the set $T_p$ into the set T.

At the 21-st line, the decoder 50 returns, as an arc-including lattice, the set of nodes and the set of arcs. That marks the end of the processes.

As described above, after the search of a digraph is completed, the decoder 50 according to the third embodiment generates arcs and adds them in a lattice. As a result, the decoder 50 need not generate and destroy arcs while searching the digraph, thereby enabling achieving reduction in the calculation cost of the search operation.

Fourth Embodiment

Figure 12:
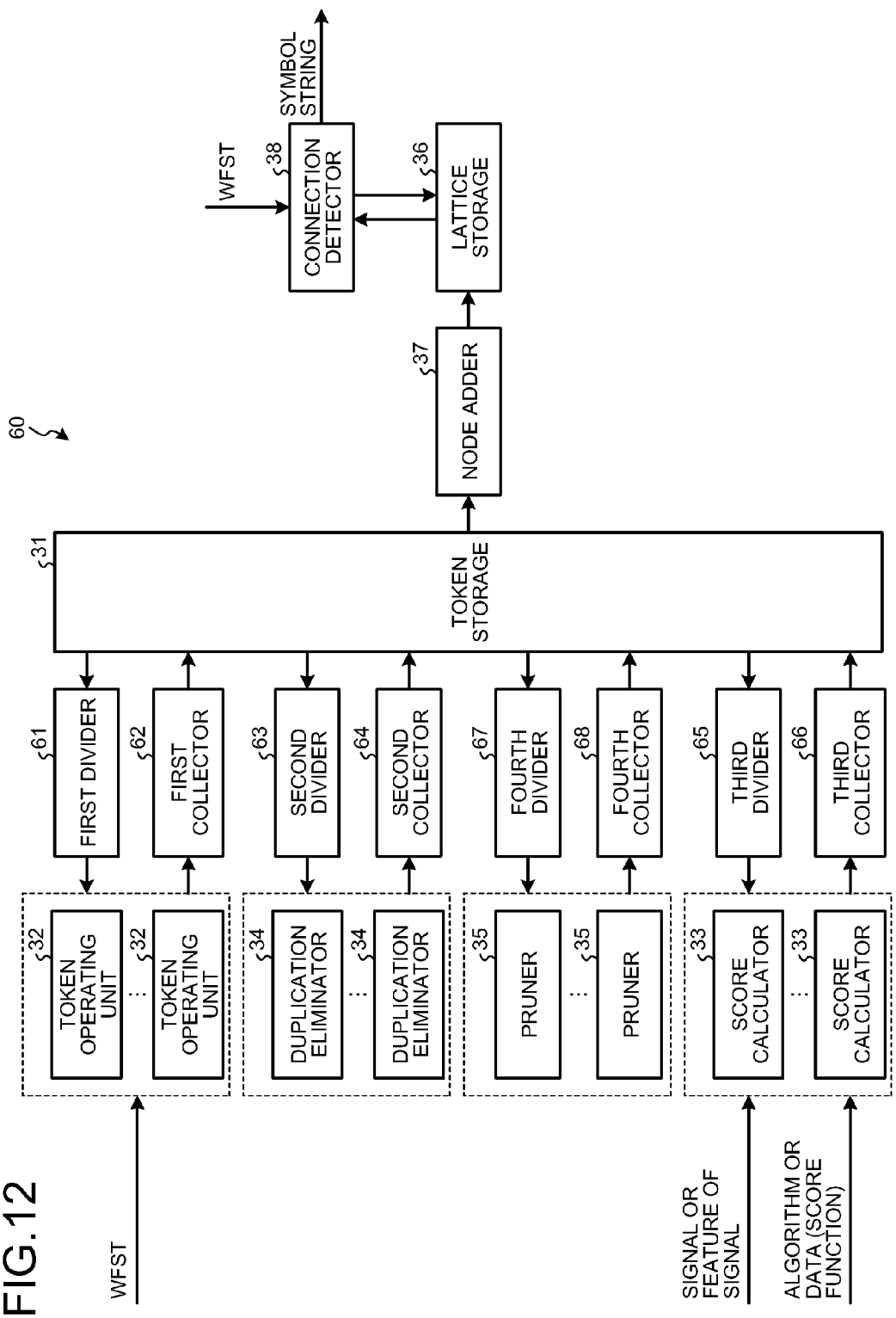
FIG. 12 is a block diagram of a decoder according to a fourth embodiment.

FIG. 12 is a block diagram of a decoder 60 according to a fourth embodiment. In the pattern recognition device 10, the decoder 60 according to the fourth embodiment is installed in place of the decoder 20 according to the first embodiment. The configuration of the decoder 60 and the computer programs executed therein are substantially identical to the decoder 20 according to the first embodiment. Hence, regarding the identical functions and configuration, same reference numerals are used in the drawings. Moreover, the detailed explanation of the identical functions and configuration is not repeated. That is, the explanation is given only about the differences.

The decoder 60 according to the fourth embodiment includes the token storage 31, a plurality of token operating units 32, a plurality of score calculators 33, a plurality of duplication eliminators 34, a plurality of pruners 35, the lattice storage 36, the node adder 37, the connection detector 38, a first divider 61, a first collector 62, a second divider 63, a second collector 64, a third divider 65, a third collector 66, a fourth divider 67, and a fourth collector 68.

Every time a signal or a feature is input, the first divider 61 divides a plurality of tokens, which is stored in the token storage 31, into a plurality of small sets corresponding to the plurality of token operating units 32. Then, to each token operating unit 32, the first divider 61 distributes the tokens included in the corresponding small set. Then, each token operating unit 32 propagates each token included in the received small set to the next state. In this case, the token operating units 32 perform the processes in parallel to each other.

The first collector 62 collects the tokens propagated by the token operating units 32. Then, the first collector 62 stores the collected tokens in the token storage 31.

The second divider 63 divides the tokens, which are collected by the first collector 62 and stored in the token storage 31, into a plurality of small sets corresponding to the plurality of duplication eliminators 34. In this case, the second divider 63 divides the tokens in such a way that the tokens that have reached the same state are included in the same small set. Then, to each duplication eliminator 34, the second divider 63 distributes the tokens included in the corresponding small set. Subsequently, each duplication eliminator 34 eliminates the duplication of tokens that are included in the corresponding received small set as the tokens reaching the same state. More particularly, each duplication eliminator 34 keeps the token having the best accumulation score from among the tokens that have reached the same state. In this case, the duplication eliminators 34 perform the processes in parallel to each other.

The second collector 64 collects the tokens that remain after the elimination performed by the duplication eliminators 34. Then, the second collector 64 stores the collected tokens in the token storage 31.

The third divider 65 divides the tokens, which are collected by the second collector 64 and stored in the token storage 31, into a plurality of small sets corresponding to the score calculators 33. Then, to each score calculator 33, the third divider 65 distributes the tokens included in the corresponding small set. Subsequently, each score calculator 33 calculates the signal score and the accumulation score corresponding to each token included in the received small set. In this case, the score calculators 33 perform the processes in parallel to each other.

The third collector 66 collects the tokens for which the score calculators 33 have calculated the scores. Then, the third collector 66 stores the collected tokens in the token storage 31.

The fourth divider 67 divides the tokens, which are collected by the third collector 66 and stored in the token storage 31, into a plurality of small sets corresponding to the pruners 35. Then, to each pruner 35, the fourth divider 67 distributes the tokens included in the corresponding small set. Subsequently, each pruner 35 eliminates the tokens having the accumulation score worse than a certain score. In this case, the pruners 35 perform the processes in parallel to each other.

The fourth collector 68 collects the tokens for which the pruners 35 have calculated the scores. Then, the fourth collector 68 stores the collected tokens in the token storage 31.

Meanwhile, the decoder 60 according to the fourth embodiment can be configured to also include the eliminator 41 illustrated in FIG. 7 and the arc adder 51 illustrated in FIG. 10.

Figure 13:
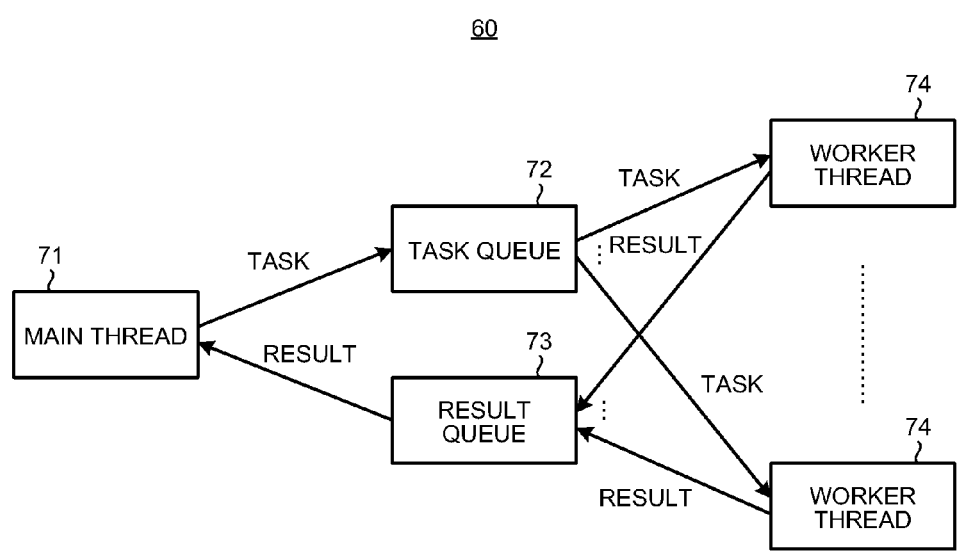
FIG. 13 is a block diagram illustrating threads of the decoder according to the fourth embodiment.

FIG. 13 is a block diagram illustrating threads of the decoder 60 according to the fourth embodiment. Regarding the hardware configuration of the pattern recognition device 10 according to the fourth embodiment, one or more CPUs 101 are added to the hardware configuration illustrated in FIG. 6.

The decoder 60 executes tasks using a plurality of threads run by the CPUs 101. As an example, the decoder 60 includes a main thread 71, a task queue 72, a result queue 73, and a plurality of worker threads 74.

The main thread 71 performs the process of generating tasks and storing them in the task queue 72 and performs the process of obtaining results from the result queue 73 and integrating them. The worker threads 74 obtain the tasks from the task queue 72 and execute them. The worker threads 74 included in the decoder 60 are equal in number to the number of tasks to be performed concurrently. As an example, the decoder 60 includes the worker threads 74 equal in number to the number of CPUs 101. Each worker thread 74 stores the result of task execution in the result queue 73.

The task queue 72 and the result queue 73 are subjected to exclusive access control, and are not accessible to the worker threads 74 and the main thread 71 at the same time. Meanwhile, when there is only a single CPU 101, the decoder 60 does not include any worker thread 74. Instead, the main thread 71 executes the tasks. Thus, when there is only a single CPU 101, the decoder 60 need not perform exclusive access control, thereby enabling achieving reduction in the processing cost.

FIG. 14 is a diagram illustrating a pseudo code for the processes performed in the main thread 71 of the decoder 60 according to the fourth embodiment. FIG. 15 is a diagram illustrating a pseudo code for the processes performed in the worker threads 74 of the decoder 60 according to the first embodiment.

Herein, in order to distinguish between the line numbers in the pseudo code illustrated in FIG. 14 and the line numbers in the pseudo code illustrated in FIG. 15; the pseudo code illustrated in FIG. 14 starts from the first line, while the pseudo code illustrated in FIG. 14 starts from the 101-st line.

Herein, $Q_{task}$ represents the task queue 72, and $Q_{result}$ represents the result queue 73.

Every time the feature is input, the decoder 60 performs the operations from the third line to the 12-th line in a repeated manner. As the outline, in the first phase (from the fourth line to the eighth line), the decoder 60 propagates the tokens to the next states. In the second phase (from the ninth line to the 13-th line), the decoder 60 eliminates the unnecessary tokens. In the third phase (from the 14-th line to the 19-th line), the decoder 60 outputs the signal scores and the accumulation scores. In the fourth phase (from the 21-st line to the 25-th line), the decoder 60 prunes the tokens not satisfying the accumulation scores, and adds the rest of the tokens as the nodes of a lattice in the set L[f]. From the 26-th line onward, the operations are identical to the operations from the 16-th line onward of the pseudo code illustrated in FIG. 4 according to the first embodiment.

Given below is the explanation of the operations performed at each line.

At the first line illustrated in FIG. 14, the main thread 71 initializes a variable n, which represents the number of tasks being processed, to zero. The other operations are identical to the operations performed at the first line of the pseudo code illustrated in FIG. 4.

The operations at the second line and the third line are identical to the operations at the second line and the third line of the pseudo code illustrated in FIG. 4.

At the fourth line, the main thread 71 divides a plurality of tokens, which corresponds to a plurality of nodes recorded in the set L[f] using a function "split", and returns a set in which small sets having one or more tokens are the elements. The set of those elements is referred to as $T_{sub}$. Then, for each small set, the main thread 71 performs the operation at the fifth line.

Herein, the function "split" can divide the tokens in an arbitrary manner. As an example, the function "split" divides the tokens into small sets equal in number to the number of worker threads 74. Alternatively, the function "split" can divide the tokens into small sets equal in number to the number of nodes included in the set L[f]. As a result, the processes for a single token can be performed in a single task. Meanwhile, smaller the divisions, greater is the degree of concurrency. However, that leads to an increase in the number of times of performing queue operations at the fifth line and the eighth line. Hence, it is not always true that the processing speed increases on the whole.

At the fifth line, the main thread 71 adds a task named phase1 in the task queue $Q_{task}$. The data attached to that task is $T_{sub}$. Since a single task is added, the main thread 71 increments n by one.

At the sixth line, the main thread 71 sets the set T to an empty set.

The seventh line indicates that the operation at the eighth line is performed until all tasks are processed. At the eighth line, the main thread 71 obtains a result from the result queue $Q_{result}$. The values that are obtained represent a set of post-propagating tokens. Then, the main thread 71 adds the obtained values to the set T. Herein, obtaining a result implies that a single task is completed. Hence, the main thread 71 decrements n by one. If there is not a single result in the result queue $Q_{result}$, then the main thread 71 waits till a result is obtained.

Each worker thread 74 processes a task added at the fifth line according to the pseudo code illustrated in FIG. 15. The 101-st line of the pseudo code illustrated in FIG. 15 indicates that the operations from the 102-nd line to the 122-nd line are performed in a repeated manner till the completion of operations. At the 102-nd line, the worker thread 74 waits until a task is added in the task queue $Q_{task}$. Once a task is added in the task queue $Q_{task}$, the worker thread 74 retrieves that task and sets $u_{name}$ as the name of the task and sets $u_{data}$ as the data of the task.

The 103-rd line indicates that, when the name of an added task is phase1, the operations from the 104-th line to the 109-th line are performed. At the 104-th line, the worker thread 74 retrieves data from $u_{data}$ and sets it as a set $T_t$. Moreover, the worker thread 74 initializes a set $T_{new}$ to an empty set. The 105-th line indicates that the operations from the 106-th line to the 108-th line are performed with respect to each token included in the set $T_t$.

From the 106-th line to the 108-th line, the worker thread 74 changes the set for adding tokens to the set $T_{new}$, and performs operations identical to the operations from the sixth line to the eighth line of the pseudo code illustrated in FIG. 4. At the 109-th line, the worker thread 74 adds the set $T_{new}$ of obtained tokens to the result queue $Q_{result}$. That marks the end of the processing of that task.

At the ninth line of the pseudo code illustrated in FIG. 14, the main thread 71 divides the set of tokens using the function "split" and returns the set $T_{sub}$ in which the small sets of one or more tokens are the elements. Then, for each small set, the main thread 71 performs the operation at the 10-th line.

At the ninth line, unlike at the fourth line, the main thread 71 divides the tokens according to a condition that the tokens assigned with the same state are included in the same set of tokens. Assume that $T_1$ and $T_2$ represent the post-division small sets of tokens, and state($T_1$) and state($T_2$) represent the sets of states of the tokens included in the small sets $T_1$ and $T_2$, respectively. In this case, the state state($t_1$) and the state state($t_2$) should not have the same states included therein. Meanwhile, of a plurality of tokens having the same state and the same context information, the decoder 60 can keep only the token having the best accumulation score. In that case, since a plurality of tokens gets assigned to the same state, the main thread 71 divides the tokens at the ninth line under the condition that the tokens having the same state and the same context information are included in the same set of tokens.

At the 10-th line, the main thread 71 adds a task named phase2 to the task queue $Q_{task}$. The data attached to that task is $T_{sub}$. Since a single task is added, the main thread 71 increments n by one.

At the 11-th line, the main thread 71 sets the set T to an empty set.

The 12-th line indicates that the operation at the 13-th line is performed until all the tasks are processed. At the 13-th line, the main thread 71 obtains the result from the result queue $Q_{result}$. The obtained value represents the set of tokens from which the unnecessary tokens have been eliminated. Then, the main thread 71 adds the obtained value in the set T. Herein, obtaining a result implies that a single task is completed. Hence, the main thread 71 decrements n by one. If there is not a single result in the result queue $Q_{result}$, then the main thread 71 waits till a result is obtained.

The worker thread 74 processes the task, which is added at the 10-th line, according to the pseudo code illustrated in FIG. 15. The 110-th line indicates that, when the added task is named phase2, the operations at the 111-th and 112-th lines are performed.

At the 111-th line, the worker thread 74 retrieves data from $u_{data}$ and sets it as the set $T_t$. At the 112-th line, the worker thread 74 performs the same operation as the operation performed at the ninth line of the pseudo code illustrated in FIG. 4. That is, among the tokens included in the set $T_t$, when a plurality of tokens are assigned with the same state, the worker thread 74 keeps only a single token having the best accumulation score. Then, the worker thread 74 adds the set of such tokens in the result queue $Q_{result}$ and ends the processing of the task.

At the 14-th line of the pseudo code illustrated in FIG. 14, in an identical manner to the fourth line, the main thread 71 divides the set of tokens using the function "split", and returns a set in which small sets having one or more tokens are the elements. Then, for each small set, the main thread 71 performs the operation at the 15-th line.

At the 15-th line, the main thread 71 adds a task named phase3 in the task queue $Q_{task}$. The data attached to that task is $T_{sub}$ and the feature v. Since a single task is added, the main thread 71 increments n by one.

At the 16-th line, the main thread 71 sets the set T to an empty set. Moreover, the main thread 71 initializes $w_{max}$ to minus infinity. In practice, the main thread 71 sets the minimum possible value in $w_{max}$.

The 17-th line indicates that the operations at the 18-th and 19-th lines are performed until all tasks are processed. At the 18-th line, the main thread 71 obtains a result from the result queue $Q_{result}$. The obtained values are assumed to be $T_r$ and $w_r$. Herein, obtaining a result implies that a single task is completed. Hence, the main thread 71 decrements n by one. If there is not a single result in the result queue $Q_{result}$, then the main thread 71 waits till a result is obtained.

At the 19-th line, the main thread 71 adds the value $T_r$ in the set T. Moreover, if a weight $w_r$ is greater than $w_{max}$, then the main thread 71 updates $w_{max}$ with the weight $w_r$.

The worker thread 74 processes the task, which is added at the 15-th line, according to the pseudo code illustrated in FIG. 15. The 113-th line indicates that, when the added task is named phase3, the operations from the 114-th line to the 119-th line are performed.

At the 114-th line, the worker thread 74 retrieves data from $u_{data}$ and sets the retrieved set of token as the set $T_t$ and sets the feature as v. From the 115-th line to the 118-th line, the worker thread 74 changes the set T to the set $T_t$ and performs the same operations as the operations from the 10-th line to the 13-th line of the pseudo code illustrated in FIG. 4. At the 119-th line, the worker thread 74 adds a 2-tuple ($T_t$, $w_{max}$) to the result queue $Q_{result}$. That marks the end of the processing of the task.

At the 20-th line of the pseudo code illustrated in FIG. 14, the main thread 71 performs the same operation as the operation performed at the 14-th line of the pseudo code illustrated in FIG. 4.

At the 21-st line, in an identical manner to the fourth line, the main thread 71 divides the set of tokens using the function "split" and returns a set in which the small sets of one or more tokens are the elements. Then, for each small set, the main thread 71 performs the operation at the 22-nd line.

At the 22-nd line, the main thread 71 adds a task named phase4 in the task queue $Q_{task}$. The data attached to that task is $T_{sub}$ and the maximum value $w_{max}$ of the accumulation scores. Since a single task is added, the main thread 71 increments n by one.

At the 23-rd line, the main thread 71 sets the set L[f] to an empty set.

The 24-th line indicates that the operation at the 25-th line is performed until all tasks are processed. At the 25-th line, the main thread 71 obtains a result from the result queue $Q_{result}$. The values that are obtained represent a set of tokens excluding the pruned tokens. Then, the main thread 71 adds the obtained result to the set L[f]. Herein, obtaining a result implies that a single task is completed. Hence, the main thread 71 decrements n by one. If there is not a single result in the result queue $Q_{result}$, then the main thread 71 waits till a result is obtained.

The worker thread 74 processes the task, which is added at the 22-nd line, according to the pseudo code illustrated in FIG. 15. The 120-th line indicates that, when the added task is named phase4, the operations at the 121-st and 122-nd lines are performed.

At the 121-st line, the worker thread 74 retrieves data from $u_{data}$; sets $T_t$ as the set of tokens; and sets $w_{max}$ as the maximum value of the accumulation scores. At the 122-nd line, the worker thread 74 performs the same operation as the operation performed at the 15-th line of the pseudo code illustrated in FIG. 4. That is, the worker thread 74 eliminates such tokens which have the accumulation score smaller than a value obtained by subtracting a constant value $w_{beam}$ from $w_{max}$. Then, the worker thread 74 adds the set of remaining tokens in the result queue $Q_{result}$, and ends the processing of the task.

Then, from the 26-th line to the 35-th line of the pseudo code illustrated in FIG. 14, the main thread 71 performs operations identical to the operations performed from the 16-th line to the 25-th line of the pseudo code illustrated in FIG. 4.

As described above, using the task queue 72 and the result queue 73, the decoder 60 communicates data between the main thread 71 and the worker thread 74. For that reason, in the decoder 60, as long as the task queue 72 and the result queue 73 are subjected to exclusive access control, it is not necessary to perform exclusive access control for other constituent elements.

Meanwhile, the function "prune" according to the second embodiment can also be processed as a task in the worker thread 74. In that case, addition of the task in the result queue $Q_{result}$ can be done at any point of time during the operations performed from the second line to the 25-th line of the pseudo code illustrated in FIG. 14. However, the range including the node being added during the operation at the 25-th line cannot be sent to the function "prune". As long as that range is not included, then the lattice does not get changed during the operations performed from the second line to the 25-th line of the pseudo code illustrated in FIG. 4. Hence, the function "prune" and the operations performed from the second line to the 25-th line of the pseudo code except the range described above can be processed in a mutually independent manner.

Regarding the process of obtaining the feature performed at the third line, the main thread 71 can alternatively perform that operation immediately before the 14-th line. By delaying the process of obtaining the feature, the pattern recognition device 10 becomes able to perform the process of calculating the feature and the process of propagating the tokens in parallel.

In this way, the decoder 60 according to the fourth embodiment can perform processes in parallel using a plurality of CPUs 101. Hence, it becomes possible to reduce the processing time.

Modification Example of Digraph

In the first to fourth embodiments, the explanation is given for an example in which a WFST is used as the digraph to be searched. Alternatively, it is also possible to search another type of digraph and generate a lattice in an identical manner. Herein, another type of digraph points to a digraph in which the input symbols, the output symbols, and the weights are assigned in a different manner than a WFST. In a digraph, as long as the input symbols, the output symbols, and the weights are assigned to either the states or the transitions; any type of digraph can be used.

There are eight types of such a digraph. Moreover, these digraphs are convertible into each other. For example, in the first to fourth embodiments, all incoming transitions have the same input symbol assigned thereto. That is same as assigning the input symbol to the states. That is, even if the input symbols assigned to the transitions are reassigned to the states, an input symbol string obtained by joining the input symbols in a path is identical to the input symbol string obtained before reassignment of the input symbols.

Meanwhile, in the case of not using a language model and the transition probability of an HMM; the weights in the digraph become equal to zero. For example, in the case of performing isolated word recognition, a digraph having the weights equal to zero is used. In that case, the decoder 20 need not hold the weights in the storage area, and need not perform all processes related to the weights.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A decoder for searching a digraph and generating a lattice, partially or entirely, corresponding to a signal that is input or corresponding to a feature of the signal, the digraph having an input symbol and an output symbol assigned to a state or a transition, the input symbol being a score identifier that represents at least either an algorithm or data for calculating a signal score from the signal or the feature, the decoder comprising:
   a processor that executes instructions that facilitate performance of operations, comprising:
   every time the signal or the feature is input, propagating each of a plurality of tokens, which is an object assigned with a state of the head of a path being searched, based on using the digraph to determine that a state or a transition assigned with a non-empty input symbol is reached;
   in each instance of token propagating, adding, in the lattice, a node corresponding to a state assigned to each of the plurality of tokens,
   as a function of using the digraph, detecting a first node that is connected to a second node added in an i-th instance (where i is an integer equal to or greater than one) in the lattice and that is added in an i+1-th instance in the lattice; and
   outputting an output symbol with which the output symbol in the state corresponding to the first node and the output symbol in the state corresponding to the second node are concatenated, when the output symbol being assigned the state, the transition on the digraph detecting the second node connected to the first node, or outputting an output symbol assigned to an arc or the transition and the output symbol in the preceding and succeeding transitions are concatenated, when the output symbol being assigned the transition, the arc generated from the transition and the first node and the second node;
   every time the signal or the feature is input for a predetermined number of times, eliminating unnecessary nodes from the lattice.

2. The decoder according to claim 1, the operations further comprising adding, in the lattice, an arc from the node added at the i-th instance in the lattice to the node added at the i+1-th node in the lattice.

3. The decoder according to claim 2, the operations further comprising adding the arc in the lattice after completion of adding nodes.

4. The decoder according to claim 1, the operations further comprising every time the tokens are propagated, calculating, with respect to each of the plurality of tokens, a signal score corresponding to the input symbol assigned to a state or a transition of the head of a path and an accumulation score obtained by accumulating the signal scores in the path.

5. The decoder according to claim 4, wherein, with respect to each of the node that is added, the operations further comprising associating the signal scores and the accumulation score of the token holding information to generate the node and associating a state of the head of a path represented by the token holding the information.

6. The decoder according to claim 5, wherein, when the node added in the i-th instance is treated as a first node and the node connected to the first node and added in the i+1-th instance is treated as a second node, the operations further comprising detecting a path in which the accumulation score associated to the second node is identical to the value obtained by adding the accumulation score associated to the first node and the signal score associated to the second node.

7. The decoder according to claim 4, wherein
   the digraph has a weight assigned to a state or a transition, and
   with respect to each of the plurality of tokens, the operations further comprising calculating the signal score and calculating an accumulation score obtained by accumulating the weights and the signal scores in a path represented by the token.

8. The decoder according to claim 7, wherein, with respect to each of the nodes that is added, the operations further comprising associating the signal scores and the accumulation score of the token holding information to generate the node and associating a state of the head of a path represented by the token holding the information.

9. The decoder according to claim 8, wherein, when the node added in the i-th instance is treated as a first node and the node connected to the first node and added in the i+1-th instance is treated as a second node, the operations further comprising detecting a path in which the accumulation score associated to the second node is identical to the value obtained by adding the accumulation score associated to the first node, the signal score associated to the second node, and weights in a path connecting the first node and the second node.

10. The decoder according to claim 1, the operations further comprising:
    performing a plurality of token operation processes in parallel to each other;
    performing a plurality of duplication elimination processes in parallel to each other;
    dividing the plurality of tokens into a plurality of first small sets corresponding to the plurality of token operation processes and distributing, to each of the plurality of token operation processes, tokens included in corresponding first small sets;
    collecting a plurality of tokens propagated by the plurality of token operating processes;
    dividing the plurality of tokens into a plurality of second small sets corresponding to the duplication elimination processes, and distributing, to each of the plurality of duplication elimination processes, tokens included in corresponding second small sets; and
    collecting a plurality of tokens that remain after elimination is performed by the plurality of duplication elimination processes.

11. The decoder according to claim 10, wherein the operations further comprise putting tokens reaching same state into the second small sets.

12. The decoder according to claim 1, the operations further comprising:

in parallel calculating, every time the tokens are propagated, a signal score corresponding to the input symbol assigned to a state or a transition of the head of a path represented by the token and an accumulation score obtained by accumulating the signal scores in the path represented by the path;

dividing the plurality of tokens into a plurality of small sets and distributing tokens included in corresponding small set; and collecting a plurality of tokens for which the signal score and the accumulation score have been calculated.

13. The decoder according to claim 12, the operations further comprising from among a plurality of tokens reaching same state, keeping a token having best of the accumulation scores.

14. The decoder according to claim 1, the operations further comprising:

in parallel to each other, eliminating tokens having an accumulation score worse than a certain score;

dividing the plurality of tokens into a plurality of small sets, and distributing tokens included in corresponding small set; and collecting a plurality of tokens that remain after performance of an elimination.

15. A decoder for searching a digraph and generating a lattice, partially or entirely, corresponding to a signal that is input or corresponding to a feature of the signal, the digraph having an input symbol and an output symbol assigned to a state or a transition, the input symbol being a score identifier that represents at least either an algorithm or data for calculating a signal score from the signal or the feature, the decoder comprising:

a processor that executes instructions that facilitate performance of operations, comprising:

every time the signal or the feature is input, propagating each of a plurality of tokens, which is an object assigned with a state of the head of a path being searched, based on using the digraph to determine that a state or a transition assigned with a non-empty input symbol is reached;

in each instance of token propagating, adding, in the lattice, a node corresponding to a state assigned to each of the plurality of tokens, as a function of using the digraph, detecting a first node that is connected to a second node added in an i-th instance (where i is an integer equal to or greater than one) in the lattice and that is added in an i+1-th instance in the lattice; and every time the signal or the feature is input for a predetermined number of times, eliminating unnecessary nodes from the lattice.

16. A decoder for searching a digraph and generating a lattice, partially or entirely, corresponding to a signal that is input or corresponding to a feature of the signal, the digraph having an input symbol and an output symbol assigned to a state or a transition, the input symbol being a score identifier that represents at least either an algorithm or data for calculating a signal score from the signal or the feature, the decoder comprising:

a processor that executes instructions that facilitate performance of operations, comprising:

every time the signal or the feature is input, propagating each of a plurality of tokens, which is an object assigned with a state of the head of a path being searched, based on using the digraph to determine that a state or a transition assigned with a non-empty input symbol is reached;

in each instance of token propagating, adding, in the lattice, a node corresponding to a state assigned to each of the plurality of tokens, as a function of using the digraph, detecting a first node that is connected to a second node added in an i-th instance (where i is an integer equal to or greater than one) in the lattice and that is added in an i+1-th instance in the lattice; and every time the signal or the feature is input for a predetermined number of times, eliminating unnecessary nodes from the lattice, wherein the eliminating further comprising referring to the digraph and, of nodes added in the i-th instance in the lattice, eliminating nodes that do not reach any of nodes added in the i+1-th instance in the lattice.

17. The decoder according to claim 16, the operations further comprising every time the tokens are propagated, calculating, with respect to each of the plurality of tokens, a signal score corresponding to the input symbol assigned to a state or a transition of the head of a path and an accumulation score obtained by accumulating the signal scores in the path, wherein when the node added in the i-th instance is treated as a first node and the node connected to the first node and added in the i+1-th instance is treated as a second node, the operations further comprise eliminating nodes present in paths excluding a path in which the accumulation score associated to the second node is identical to the value obtained by adding the accumulation score associated to the first node and the signal score associated to the second node.

18. The decoder according to claim 17, wherein the digraph has a weight assigned to a state or a transition, with respect to each of the plurality of tokens, the operations further comprise calculating the signal score and calculating an accumulation score obtained by accumulating the weights and the signal scores in a path represented by the token, and when the node added in the i-th instance is treated as a first node and the node connected to the first node and added in the i+1-th instance is treated as a second node, eliminating nodes present in paths excluding a path in which the accumulation score associated to the second node is identical to the value obtained by adding the accumulation score associated to the first node, the signal score associated to the second node, and weights in a path connecting the first node and the second node.

* * * * *